(12) United States Patent
Kaida et al.

(10) Patent No.: US 12,356,082 B2
(45) Date of Patent: Jul. 8, 2025

(54) IMAGING SYSTEM, CONTROL METHOD, AND STORAGE MEDIUM

(71) Applicant: CANON KABUSHIKI KAISHA, Tokyo (JP)

(72) Inventors: Hironori Kaida, Kanagawa (JP); Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 18/164,036

(22) Filed: Feb. 3, 2023

(65) Prior Publication Data
US 2023/0269488 A1 Aug. 24, 2023

(30) Foreign Application Priority Data
Feb. 16, 2022 (JP) .................. 2022-022342

(51) Int. Cl.
*H04N 23/741* (2023.01)
*H04N 23/61* (2023.01)
*H04N 23/68* (2023.01)
*H04N 23/73* (2023.01)

(52) U.S. Cl.
CPC ......... *H04N 23/741* (2023.01); *H04N 23/681* (2023.01); *H04N 23/73* (2023.01)

(58) Field of Classification Search
CPC .... H04N 23/741; H04N 23/681; H04N 23/73; H04N 23/66; H04N 23/76; H04N 23/61; H04N 23/6811
See application file for complete search history.

(56) References Cited

U.S. PATENT DOCUMENTS

2016/0088219 A1* 3/2016 Matsumoto ............ H04N 5/783
348/169

FOREIGN PATENT DOCUMENTS

JP      2016072673 A    5/2016
WO  WO-2008010559 A1 * 1/2008 ............... G03B 5/00

* cited by examiner

*Primary Examiner* — Ahmed A Berhan
(74) *Attorney, Agent, or Firm* — Canon U.S.A., Inc., IP Division

(57) ABSTRACT

An imaging system includes an imaging apparatus and a sensor device, the imaging apparatus including an image capturing unit configured to capture an image of an object, an object motion detection unit configured to detect motion of the object using the captured image, a reception unit configured to receive a sensing result associated with the motion of the object, and an exposure control unit configured to control exposure of the image capturing unit, the sensor device attached to the object to be captured and comprising: a sensor unit configured to acquire motion information regarding the object, and a transmission unit configured to transmit a sensing result of the sensor unit to the imaging apparatus, wherein the imaging apparatus receives the sensing result of the sensor unit and controls the exposure of the image capturing unit using the sensing result from the sensor device and the detected motion of the object.

14 Claims, 23 Drawing Sheets

DIGITAL CAMERA AND SMARTPHONE

DIGITAL CAMERA AND WRISTBAND TERMINAL

SMARTPHONE AND WRISTBAND TERMINAL

PRELIMINARY IMAGING IMAGES

MOTION VECTORS

GROUP OF MOTION VECTORS OF MAIN PART

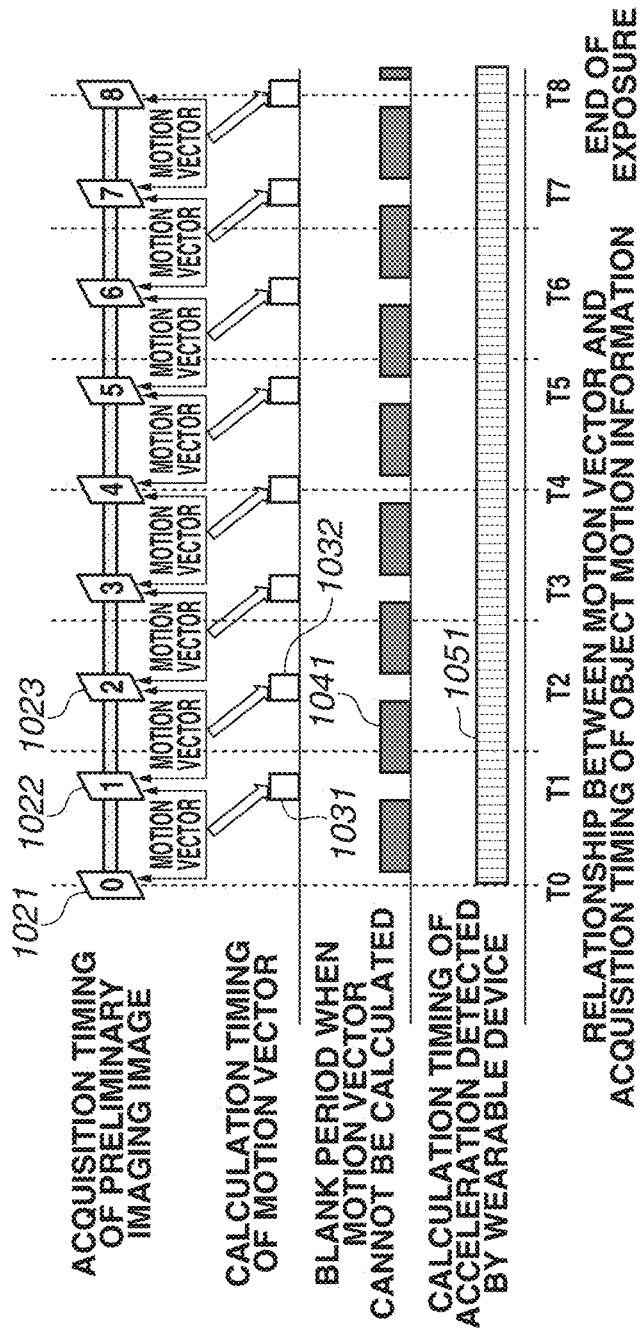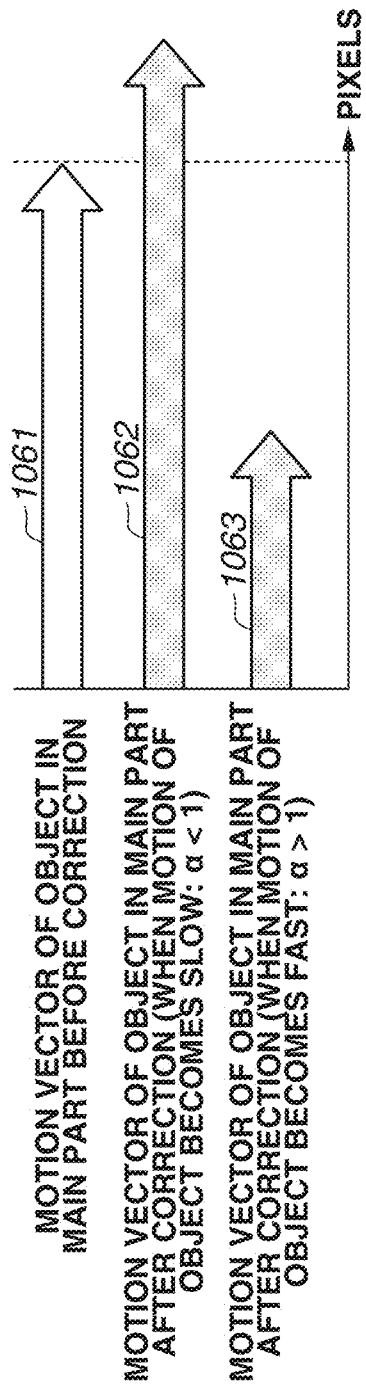

FIG.20

SETTING OF PRIORITY LEVELS OF WEARABLE DEVICES

| OBJECT ID | WEARABLE DEVICE ID | PRIORITY LEVEL |
|---|---|---|
| OBJECT A | 1701 | 4 |
| OBJECT B | 1702 | 3 |
| OBJECT B | 1703 | 2 |
| OBJECT B | 1704 | 1 |
| OBJECT C | 1705 | 5 |
| OBJECT D | 1706 | 6 |
| OBJECT E | 1707 | 7 |
| OBJECT F | 1708 | 8 |

FIG.21

ITEMS FOR DETERMINING PRIORITY OF MAIN WEARABLE DEVICE

| ITEM | SELECTION FOR DETERMINING PRIORITY OF MAIN WEARABLE DEVICE |
|---|---|
| ORDER OF SPEED OF ACCELERATION | ☑ |
| ATTACHED PART | HEAD ☐ TORSO ☐ HAND ☑ FOOT ☐ |
| ORDER OF AREA RATIO OF FACE IN ANGLE OF VIEW | ☐ |
| ORDER OF AREA RATIO OF ATTACHED PART IN ANGLE OF VIEW | ☐ |
| ORDER OF DISTANCE BETWEEN CENTER OF ANGLE OF VIEW AND WEARABLE DEVICE | ☑ |
| ORDER OF DISTANCE BETWEEN CENTER OF FACE AND WEARABLE DEVICE | ☐ |
| ORDER OF RELIABILITY OF FACE DETECTION | ☑ |

FIG.22A

| OBJECT ID | WEARABLE DEVICE ID | ORDER OF SPEED OF ACCELERATION (SCORE) | ATTACHED PART (SCORE) | ORDER OF DISTANCE BETWEEN CENTER OF ANGLE OF VIEW AND WEARABLE DEVICE (SCORE) | ORDER OF RELIABILITY OF FACE DETECTION (SCORE) | TOTAL SCORE |
|---|---|---|---|---|---|---|
| OBJECT A | 1701 | 2 (90) | LEFT HAND (100) | 4 (70) | 100 | 260 |
| OBJECT B | 1702 | — | HEAD (0) | — | — | — |
| OBJECT B | 1703 | 1 (100) | LEFT HAND (100) | 1 (100) | 100 | 300 |
| OBJECT B | 1704 | — | LEFT FOOT (0) | — | — | — |
| OBJECT C | 1705 | 3 (80) | LEFT HAND (100) | 5 (60) | 100 | 240 |
| OBJECT D | 1706 | 4 (70) | LEFT HAND (100) | 2 (90) | 90 | 250 |
| OBJECT E | 1707 | 5 (60) | LEFT HAND (100) | 3 (80) | 90 | 230 |
| OBJECT F | 1708 | 6 (50) | LEFT HAND (100) | 6 (50) | 80 | 180 |

FIG.22B

| OBJECT ID | WEARABLE DEVICE ID | PRIORITY LEVEL |
|---|---|---|
| OBJECT A | 1701 | 2 |
| OBJECT B | 1702 | — |
| OBJECT B | 1703 | 1 |
| OBJECT B | 1704 | — |
| OBJECT C | 1705 | 4 |
| OBJECT D | 1706 | 3 |
| OBJECT E | 1707 | 5 |
| OBJECT F | 1708 | 6 |

IMAGING SYSTEM, CONTROL METHOD, AND STORAGE MEDIUM

BACKGROUND OF THE DISCLOSURE

Field of the Disclosure

The present disclosure relates to a technique for controlling image capturing of a camera, and in particular, relates to an imaging system, a control method, and a storage medium.

Description of the Related Art

A technique for controlling image capturing of a camera using the sensing result of an acceleration sensor or a human detection sensor is known.

For example, the publication of Japanese Patent Application Laid-Open No. 2016-072673 discusses a technique for automatically controlling image capturing of a remotely located camera (auto image capturing) according to the situation of a mobile apparatus (a wearable device).

The technique discussed in the publication of Japanese Patent Application Laid-Open No. 2016-072673, however, mainly controls the timing of the image capturing based on a sensing result, and does not consider automatically making the image capturing settings of the camera including the motion state of an object captured by the camera. Thus, even when the timing of the image capturing can be controlled, if the motion of the object is fast, there is a possibility that the captured object blurs.

SUMMARY

The present disclosure is directed to providing a system capable of automatically determining the image capturing settings of a camera according to the motion state of an object by analyzing the motion state of the object by the camera and the sensing result of sensing the motion state of the object by a mobile apparatus.

An imaging system includes an imaging apparatus and a sensor device, the imaging apparatus including at least one processor and memory storing instructions that, when executed, configure the at least one processor of the imaging apparatus to function as: an image capturing unit configured to capture an image of an object, an object motion detection unit configured to detect motion of the object using the captured image, a reception unit configured to receive a sensing result associated with the motion of the object, and an exposure control unit configured to control exposure of the image capturing unit, the sensor device being an apparatus different from the imaging apparatus and attached to the object to be captured and comprising at least one processor and memory storing instructions that, when executed, configure the at least one processor of the sensor device to function as: a sensor unit configured to acquire motion information regarding the object, and a transmission unit configured to transmit a sensing result of the sensor unit to the imaging apparatus, wherein the imaging apparatus receives, from the transmission unit of the sensor device, the sensing result of the sensor unit and controls the exposure of the image capturing unit using the sensing result from the sensor device and the detected motion of the object captured by the imaging apparatus.

Further features of the present disclosure will become apparent from the following description of exemplary embodiments with reference to the attached drawings.

BRIEF DESCRIPTION OF THE DRAWINGS

FIGS. 10A, 10B, and 10C are diagrams in which a motion vector of an object is corrected.

FIG. 20 is an example of a setting screen where priority levels of wearable devices are set.

FIG. 21 is a diagram illustrating items for determining a priority of a wearable device.

FIGS. 22A and 22B are diagrams illustrating a method for calculating a priority level of a wearable device.

DESCRIPTION OF THE EMBODIMENTS

Exemplary embodiments of the present disclosure will be described in detail below based on the attached drawings. The following exemplary embodiments do not limit the disclosure according to the appended claims. Although a plurality of features is described in the exemplary embodiments, not all these features are essential for the disclosure, and the plurality of features may be optionally combined together. Further, in the attached drawings, the same or similar components are designated by the same reference numbers, and are not redundantly described. In the present exemplary embodiments, a smartphone or a wearable device such as a wristband terminal and a camera are caused to cooperate, and the exposure of the camera is automatically controlled, thereby executing auto image capturing.

This achieves control of the exposure for reducing blur of the motion of an object to less than or equal to desired blur even in a use case such as unmanned image capturing or selfie capturing, thereby expanding the ability to auto capture an image.

Figure 1:
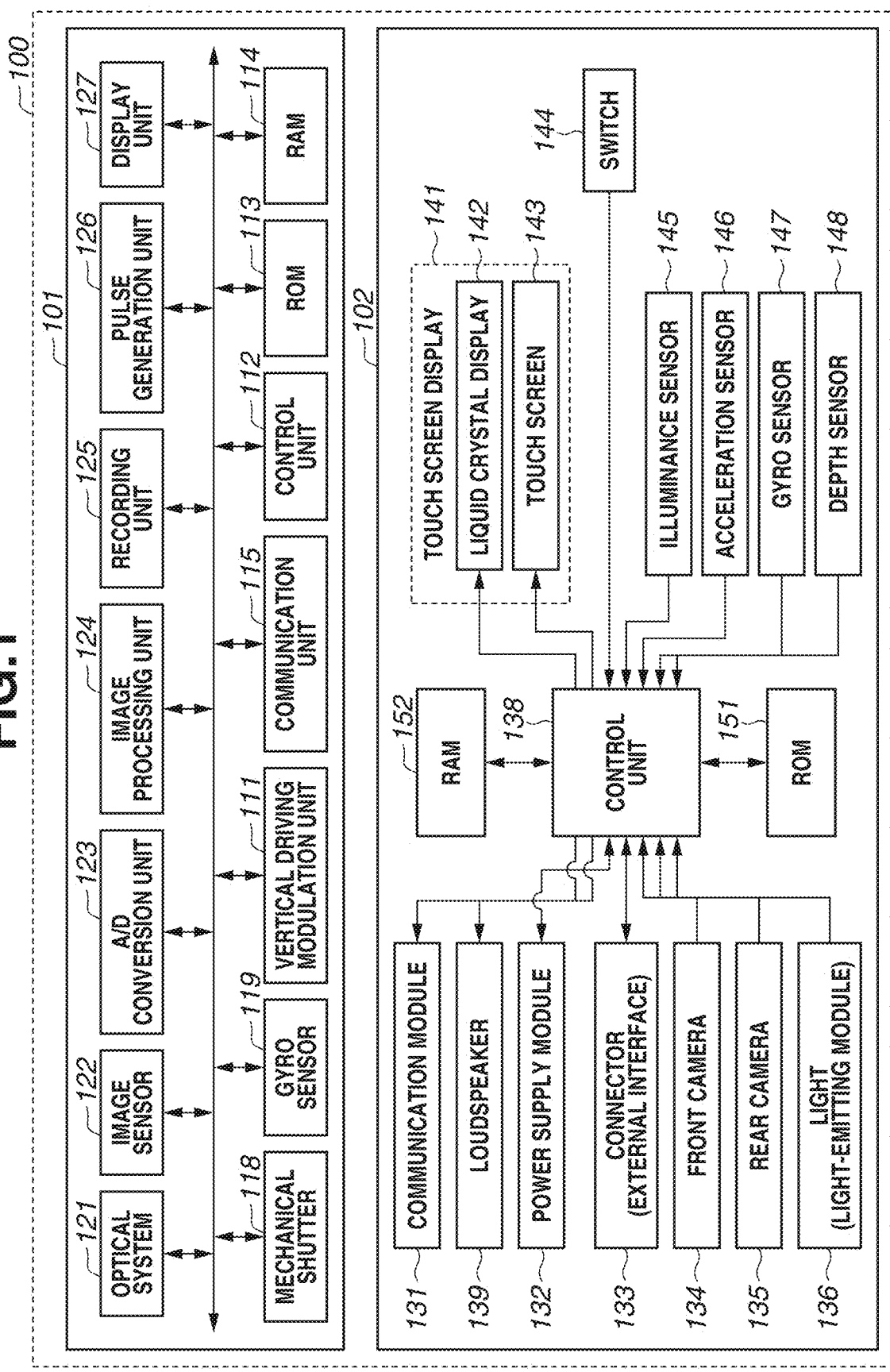
FIG. 1 is a diagram illustrating an example of a configuration of the present disclosure.
Figure 2A:
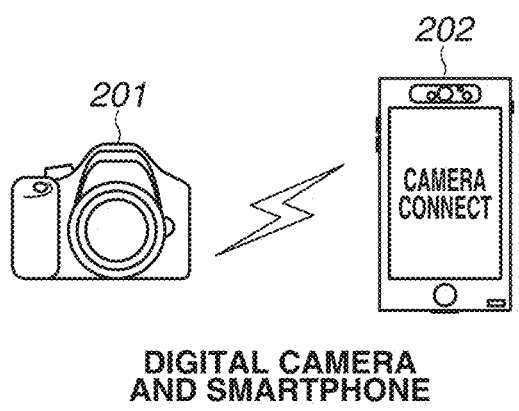
FIGS. 2A, 2B, and 2C are diagrams each illustrating an example of an external appearance of an imaging system.
Figure 2B:
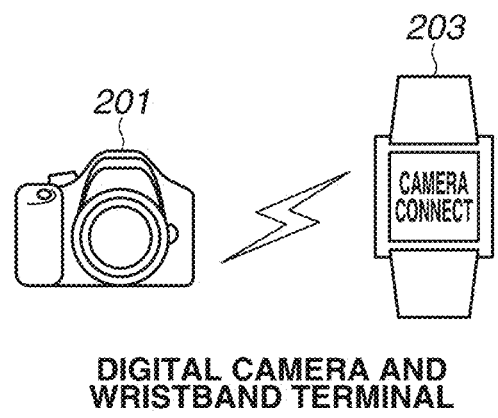
Figure 2C:
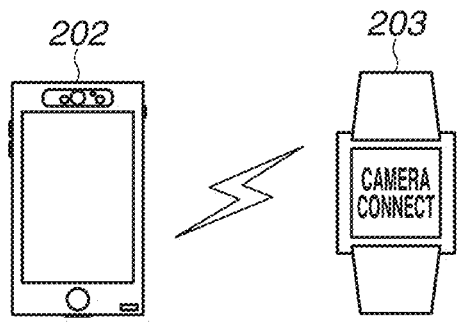

FIG. 1 is an example of an imaging system 100 described in the present exemplary embodiments. The imaging system 100 in FIG. 1 is achieved by two apparatuses, namely a camera 101 and a wearable device 102. Examples of the wearable device 102 include a smartphone and a wristband terminal. The form of the wearable device 102 does not matter. FIGS. 2A to 2C are diagrams each illustrating the external appearance of an exemplary embodiment of the present disclosure. FIG. 2A illustrates the imaging system 100 where two apparatuses, namely a digital camera 201 as the camera 101 and a smartphone 202 as the wearable device 102, are connected together.

A control unit 112 is, for example, a central processing unit (CPU). The control unit 112 reads control programs for blocks included in the camera 101 by a read-only memory (ROM) 113, loads the control programs into a random-access memory (RAM) 114, and executes the control programs. Consequently, the control unit 112 controls the operations of the blocks included in the camera 101.

The ROM 113 is an electrically erasable and recordable non-volatile memory. The ROM 113 stores operation programs for the blocks included in the camera 101 and parameters required for the operations of the blocks.

The RAM 114 is a rewritable volatile memory and is used to load a program to be executed by the control unit 112 and temporarily store data generated by the operations of the blocks included in the camera 101.

A communication unit 115 performs communication according to a predetermined wireless communication standard. Examples of the wireless communication standard include Wi-Fi based on the Institute of Electrical and Electronics Engineers (IEEE) 802.11 standard, Bluetooth®, and near-field communication (NFC). The communication unit 115 only needs to support at least one of such standards.

An optical system 121 includes a lens group including a zoom lens and a focus lens. The optical system 121 forms an object image on an imaging plane of an image sensor 122.

The image sensor 122 is composed of, for example, a charge-coupled device (CCD) or complementary metal-oxide-semiconductor (CMOS) sensor. Each pixel of the image sensor 122 photoelectrically converts an optical image formed on the imaging plane of the image sensor 122 by the optical system 121 and outputs the obtained analog image signal to an analog-to-digital (A/D) conversion unit 123.

The A/D conversion unit 123 converts an input analog image signal into digital image data, and the digital image data output from the A/D conversion unit 123 is temporarily stored in the RAM 114.

An image processing unit 124 applies various types of image processing such as white balance adjustment, color interpolation, and a gamma process on image data stored in the RAM 114. The image processing unit 124 also calculates motion vectors between recorded images and detects an object. The details of these processes will be described below.

A recording unit 125 is an attachable and detachable memory card. The recording unit 125 records image data processed by the image processing unit 124 as a recorded image via the RAM 114.

A pulse generation unit 126 supplies scan clocks (horizontal driving pulses) and predetermined control pulses to the image sensor 122 when a non-image capturing state transitions to an image capturing state. Among the scan clocks generated by the pulse generation unit 126, a vertical scan clock is input to a vertical driving modulation unit 111.

The vertical driving modulation unit 111 modulates a vertical scan clock among scan clock signals generated by the pulse generation unit 126 to a predetermined clock frequency and inputs the modulated vertical scan clock to the image sensor 122. The vertical driving modulation unit 111 determines the scanning pattern of reset scanning to be performed with respect to each line of the image sensor 122 including a plurality of pixels. This reset scanning with respect to each line of the image sensor 122 achieves a function as an electronic front curtain shutter.

A gyro sensor 119 is a motion detection sensor that detects an angular velocity. The gyro sensor 119 determines the magnitude of the shake of the camera 101.

A mechanical shutter 118 is composed of an opening/closing shutter mechanism that achieves a light blocking mechanism for physically blocking light (hereinafter, a "mechanical shutter"). The mechanical shutter 118 also serves as a rear curtain composed of a plurality of light blocking blades (hereinafter, a "mechanical rear curtain"). The control unit 112 adjusts the timing when the running of the mechanical rear curtain is started, thereby controlling the exposure time (the shutter speed). On the other hand, the function of the electronic front curtain is achieved by sequentially resetting and scanning the pixels of the image sensor 122 with respect to each line at a predetermined timing.

A display unit 127 is a display device such as a liquid crystal display (LCD). The display unit 127 displays an image stored in the RAM 114 and an image recorded in the recording unit 125 and displays an operation user interface for receiving an instruction from a user. The display unit 127 also displays an image captured by the image sensor 122 to adjust the composition during preliminary imaging.

The configuration of the camera 101 has been described above.

Next, the configuration of the wearable device 102 will be described with reference to FIG. 1. The wearable device 102 includes a touch screen display 141. A liquid crystal display 142 displays text, an image, and an icon. A touch screen 143 can detect a gesture operation.

A front camera 134 includes a lens and an image sensor such as a CCD or CMOS sensor that converts an optical image into an electric signal. The front camera 134 is a small camera module having an autofocus (AF) function, a diaphragm function, and a shutter speed adjustment function. The front camera 134 captures an object facing the touch screen display 141.

An illuminance sensor 145 acquires illuminance information regarding an object light of which is collected by the front camera 134 or a rear camera 135. The illuminance sensor 145 uses the acquired illuminance information to adjust the exposure time and the International Organization for Standardization (ISO) sensitivity when image capturing is performed.

A control unit 138 is, for example, a CPU. The control unit 138 reads control programs for blocks included in the wearable device 102 from a ROM 151, loads the control programs into a RAM 152, and executes the control programs. Consequently, the control unit 138 controls the operations of the blocks included in the wearable device 102. The control unit 138 controls the touch screen 143, a switch 144, the front camera 134, the illuminance sensor 145, the rear camera 135, and a light 136, thereby providing a camera function.

The ROM 151 is an electrically erasable and recordable non-volatile memory. The ROM 151 stores operation programs for the blocks included in the wearable device 102 and parameters required for the operations of the blocks.

The RAM 152 is a rewritable volatile memory and is used to load a program to be executed by the control unit 138 and temporarily store data generated by the operations of the blocks included in the wearable device 102.

If a sound output is turned on by the switch 144, the loudspeaker 139 outputs a shutter sound and a warning sound when image capturing is performed.

A connector 133 is used to connect the wearable device 102 and an external apparatus. For example, to the connector 133, an alternating current (AC) adapter for charging a battery included in a power supply module 132 is connected. The connector 133 is also used to input and output image data and sound data to and from a non-volatile memory externally connected to the connector 133. The connector 133 may be an exclusively designed terminal such as a dock connector or a general-purpose terminal such as a Universal Serial Bus (USB) terminal.

The rear camera 135 is a small camera module similar to the front camera 134. The rear camera 135 captures an object on the opposite side of the front camera 134. The light 136 is a light-emitting module and functions as a flash when the rear camera 135 performs image capturing.

A communication module 131 performs communication according to a predetermined wireless communication standard. Examples of the wireless communication standard include Wi-Fi based on the IEEE 802.11 standard, Bluetooth®, and NFC. The communication module 131 only needs to support at least one of such standards. Specific communication corresponds to the input and output of image data obtained by image capturing and the download of a function addition program module to the wearable device 102. The communication module 131 is also used to transmit information regarding a group of sensors (the illuminance sensor 145, an acceleration sensor 146, a gyro sensor 147, and a depth sensor 148) to the camera 101.

The power supply module 132 includes a chargeable battery. The power supply module 132 supplies power to the entirety of the wearable device 102. As the battery included in the power supply module 132, for example, a lithium-ion battery or a nickel metal-hydride battery is used.

The acceleration sensor 146 detects the direction and the magnitude of an acceleration acting on the wearable device 102. The acceleration sensor 146 can detect accelerations in three axes in XYZ directions.

The gyro sensor 147 detects the angle and the angular velocity of the wearable device 102.

The depth sensor 148 measures the distance from each camera to an object to be captured. Examples of the method for measuring the distance include a method for reflecting infrared light, light, or an ultrasound wave on an object and measuring the time until the infrared light, the light, or the ultrasound wave bounces back, and a method for arranging a plurality of cameras or pixels in parallel and acquiring depth information regarding an object from a parallax image.

FIGS. 2A to 2C each illustrate an example of the external appearance of the imaging system 100. FIGS. 2A to 2C each illustrate the combination of the camera 101 and the wearable device 102 that cooperate as the imaging system 100. The camera 101 and the wearable device 102 connect to each other via a wireless connection, for example, using Bluetooth®, communicate with each other, and cooperate as the imaging system 100. The digital camera 201 is illustrated as an example of the camera 101. The smartphone 202 is illustrated as an example of the wearable device 102. The smartphone 202 often has a camera function. Thus, the smartphone 202 can also be used as the camera 101 not as the wearable device 102 by using the camera function as in the front camera 134 or the rear camera 135 mounted on the smartphone 202 in FIG. 2C. The wearable device 102 can also use a form such as a wristband terminal 203 in addition to the smartphone 202.

The external appearance and the system configuration of the imaging system 100 have been described above.

Figure 5:
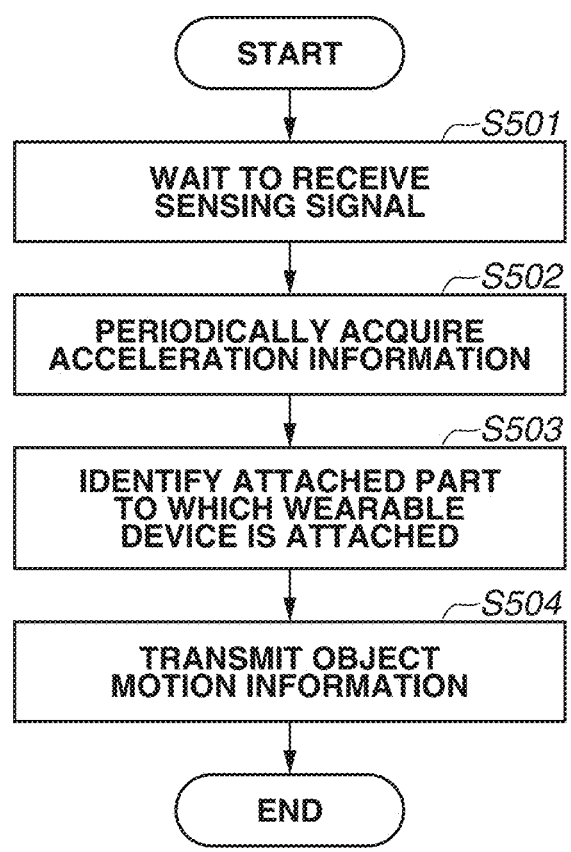
FIG. 5 is a flowchart illustrating an operation of a wearable device.

Now, the processing of the imaging system 100 according to a first exemplary embodiment of the present disclosure will be described below with reference to flowcharts in FIGS. 3 and 5. In the first exemplary embodiment, an object as an image capturing target wears the wearable device 102 and the camera 101 is placed outside the wearable device 102, constituting the configuration of a remote camera. Then, object motion information is sensed via the wearable device 102, and the image capturing conditions of the camera 101 are determined using the object motion information acquired by the wearable device 102 as auxiliary information.

First, the processing of the operation of the wearable device 102 will be described with reference to FIG. 5. The following processing is achieved by the control unit 138 controlling the components of the apparatus according to programs stored in the ROM 151.

In step S501, first, the user turns on the wearable device 102. Then, the wearable device 102 performs the operation of waiting to receive a sensing signal of the wearable device 102 from a sensor for detecting object motion information (the acceleration sensor 146, the gyro sensor 147, or the depth sensor 148).

In step S502, the communication module 131 acquires the sensing signal acquired in step S501 at a certain time interval. For example, the communication module 131 acquires acceleration information regarding the wearable device 102 as the sensing signal. To acquire the acceleration information, the communication module 131 periodically acquires an output from the acceleration sensor 146 every predetermined time. Based on the above, the communication module 131 can obtain the acceleration information regarding an object in a part to which the wearable device 102 is attached. Alternatively, the communication module 131 can also indirectly acquire the acceleration information regarding the object in the attached part to which the wearable device 102 is attached, using another sensor capable of detecting the motion state of the object instead of the acceleration sensor 146. As an example, the communication module 131 acquires a change in the distance from the camera 101 to the wearable device 102 obtained by the depth sensor 148 and thereby can calculate the motion velocity of or the acceleration information regarding the object per unit time.

In step S503, first, the user attaches the wearable device 102 to a particular position such as their wrist that does not hinder their motion. The wearable device 102 senses its attachment to the object using a tactile sensor (not illustrated). The wearable device 102 can also be freely attached to any position where the motion of the object can be recognized. In this case, as a method for identifying the attached part to which the wearable device 102 is attached, the attached device 102 may be detected from image data acquired by the camera 101. Alternatively, a method for setting in advance a part of the object to which the wearable device 102 is to be attached, and a technique for recording in advance the magnitudes of the accelerations and the velocities of particular parts in a predetermined time and identifying a moving part of the object based on an actual motion are known (Japanese Patent No. 6325581). For example, the acceleration information is acquired from the acceleration sensor 146 of the wearable device 102 in step S502. Thus, a change in the acceleration of each attached part recorded per predetermined time in advance is checked against the acquired acceleration information, whereby it is possible to identify the attached part to which the wearable device 102 is attached.

In step S504, the communication module 131 transmits the acceleration information obtained in step S502 and the attached part information regarding the wearable device 102 as object motion information to the camera 101.

This is the processing of the wearable device 102. Next, the operation of the camera 101 will be described with reference to the flowchart in FIG. 3. The processing of the flowchart in FIG. 3 is achieved by the control unit 112 controlling the components of the camera 101 according to programs stored in the ROM 113 in the camera 101 of the imaging system 100.

In step S301, the communication unit 115 receives the object motion information transmitted from the wearable device 102.

In step S302, the user starts preliminary imaging such as adjusting the composition using the camera 101. During this preliminary imaging period, the camera 101 successively captures images and displays the recorded images on the display unit 127. The user adjusts the composition while viewing the displayed preliminary imaging images. The processes of steps S303, S304, and S305 are performed during the preliminary imaging period.

In step S303, the control unit 112 determines the image capturing conditions of preliminary imaging images to be captured to detect motion vectors of the object in the composition. Although described in detail below, the control unit 112 sets a shutter speed that reduces object blur in the part to which the wearable device 102 is attached (a part of interest of the object), using the motion amount of the object in the composition when the preliminary imaging is performed under the initial image capturing conditions and the object motion information transmitted from the communication module 131 of the wearable device 102.

In step S304, the control unit 112 displays the object in the composition and image capturing setting conditions (the shutter speed, the ISO sensitivity, and the F-number) on the display unit 127.

In step S305, the control unit 112 determines whether a remote release is activated. The remote release refers to control in which the user transmits a timing signal for starting exposure in the camera 101 via the wearable device 102 connected to the camera 101. The remote release can be activated based on an output of the gyro sensor 147 when the user wearing the wearable device 102 performs a predetermined gesture, or by pressing a release button (not illustrated) of the wearable device 102. Alternatively, the control unit 112 determines whether a photographer (the user) directly presses a shutter button (not illustrated) of the camera 101. In this case, the user presses the shutter button of the camera 101 according to a shutter timing while viewing the object displayed on the display unit 127. If the shutter button of the camera 101 is pressed (YES in step S305), the processing proceeds to a main exposure process in step S306. If, on the other hand, the current timing is not a shutter timing (NO in step S305), the processing returns to step S301. In step S301, it is possible to make the image capturing settings again.

In step S306, the control unit 112 of the camera 101 performs an exposure process with the image capturing settings made in the processes of the above-described steps to capture an image, and records a captured image in the ROM 113.

As described above, during the preliminary imaging, the user repeats the setting of the exposure time of main imaging until desired motion blur is obtained, while confirming a motion blur informing image displayed on the display unit 127. Then, the user presses the shutter button at a photo opportunity.

If the shutter button of the camera 101 is pressed by the user in step S305, the camera 101 performs main imaging and records a main imaging image in the ROM 113.

Next, with reference to a flowchart in FIG. 7, a description will be given of the process of step S303, which is the feature of the present disclosure.

Figure 7:
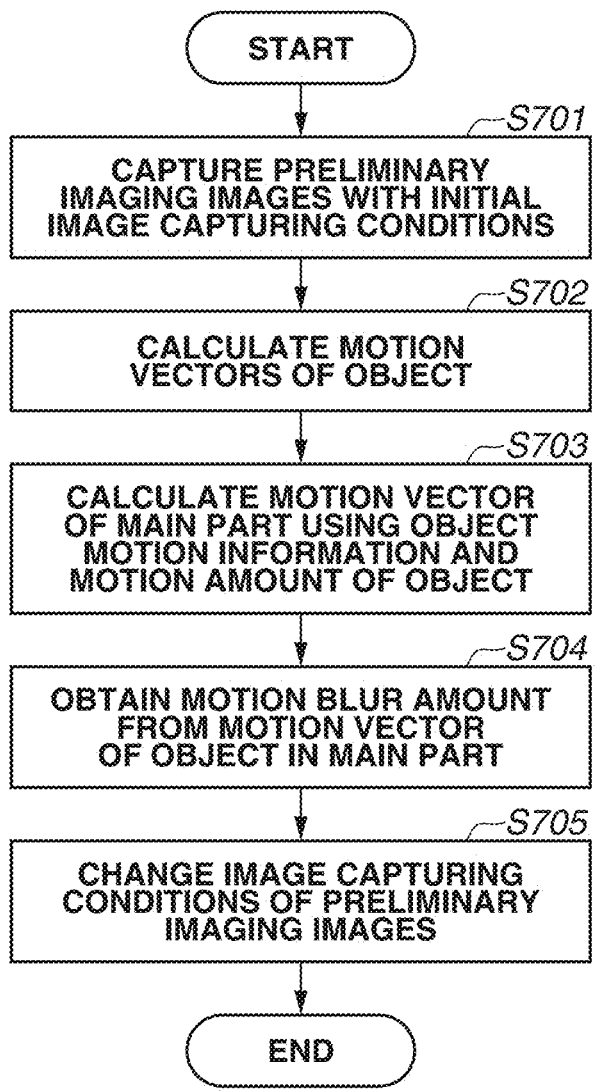
FIG. 7 is a flowchart illustrating an operation of determining image capturing conditions of preliminary imaging images.

In step S701 in FIG. 7, the control unit 112 sets the initial image capturing conditions, and the camera 101 successively captures preliminary imaging images. The "initial image capturing conditions" as used herein mainly refer to the frame rate and the shutter speed. Then, the control unit 112 sets the highest frame rate and the highest shutter speed in ranges that do not influence the process of calculating an evaluation value used to control an auto function performed by a general camera, such as auto exposure (AE) or AF control. The control unit 112 also controls the optical system 121 according to the shutter speed so that image capturing can be performed under appropriate exposure conditions even when the shutter speed is set to a high speed. For example, the control unit 112 controls the stop of a lens of the optical system 121 and the ISO sensitivity setting of the camera 101, thereby performing control so that image capturing can be performed under appropriate exposure conditions (exposure control). The camera 101 captures chronologically successive images under the initial image capturing conditions set as described above. It is desirable that the captured images should be captured with little accumulation blur in the moving object and under conditions for minimizing the amount of movement of the object between the captured successive images. Such conditions, however, are likely to increase the ISO sensitivity and also have an adverse effect such as an increase of image data with high sensitivity and much noise being acquired. On the other hand, since the amount of movement of the object is small, there is an advantage that even if the object moves fast, it is easy to catch the motion of the object.

In step S702, the image processing unit 124 calculates motion vectors of the object from the chronologically successive preliminary imaging images captured in step S701.

Figure 8A:
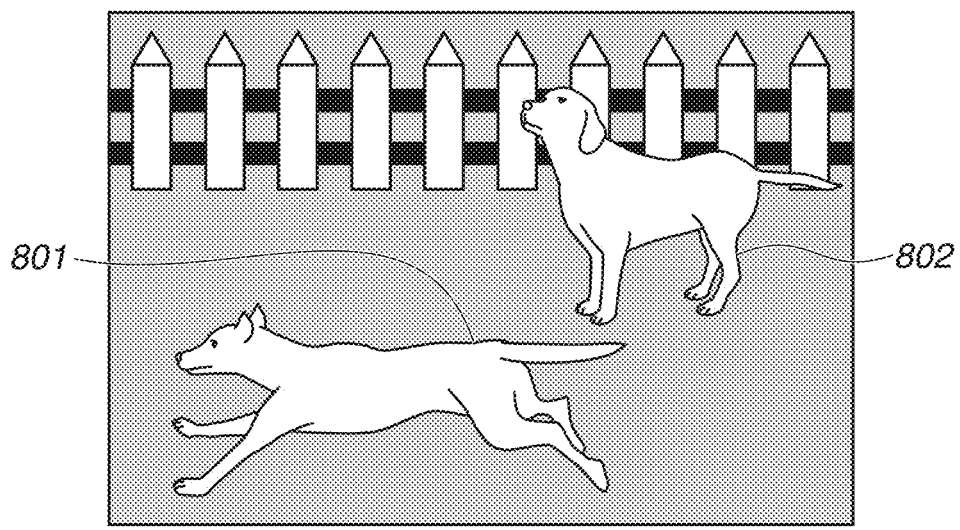
FIGS. 8A and 8B are diagrams illustrating motions of objects.
Figure 8B:
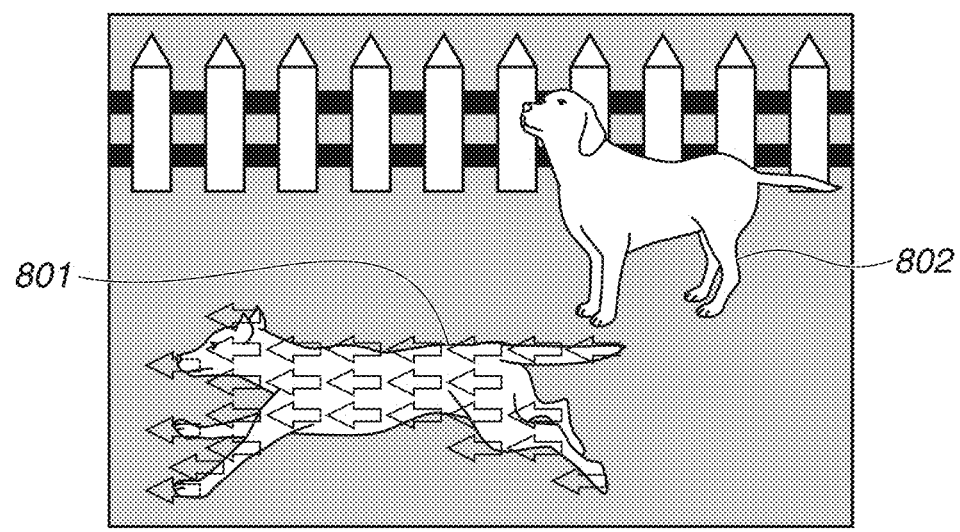

First, the motion vectors calculated from the preliminary imaging images will be described with reference to FIGS. 8A and 8B. FIGS. 8A and 8B are diagrams illustrating the motions of objects. FIG. 8A is an example where the scene of a dog 801 running to the left and a dog 802 standing still is captured. A motion vector represents the amount of movement in the horizontal direction and the amount of movement in the vertical direction of an object between preliminary imaging images. FIG. 8B illustrates examples of the motion vector.

FIG. 8B is a diagram illustrating examples of a motion vector between preliminary imaging images in FIG. 8A. In the examples of FIG. 8B, the running dog 801 is detected as motion vectors in the left direction. The dog 802 standing still and a fence on the background other than the running dog 801 are detected as motion vectors of 0, and therefore, motion vectors are not illustrated for the dog 802 and the fence.

Figure 9:
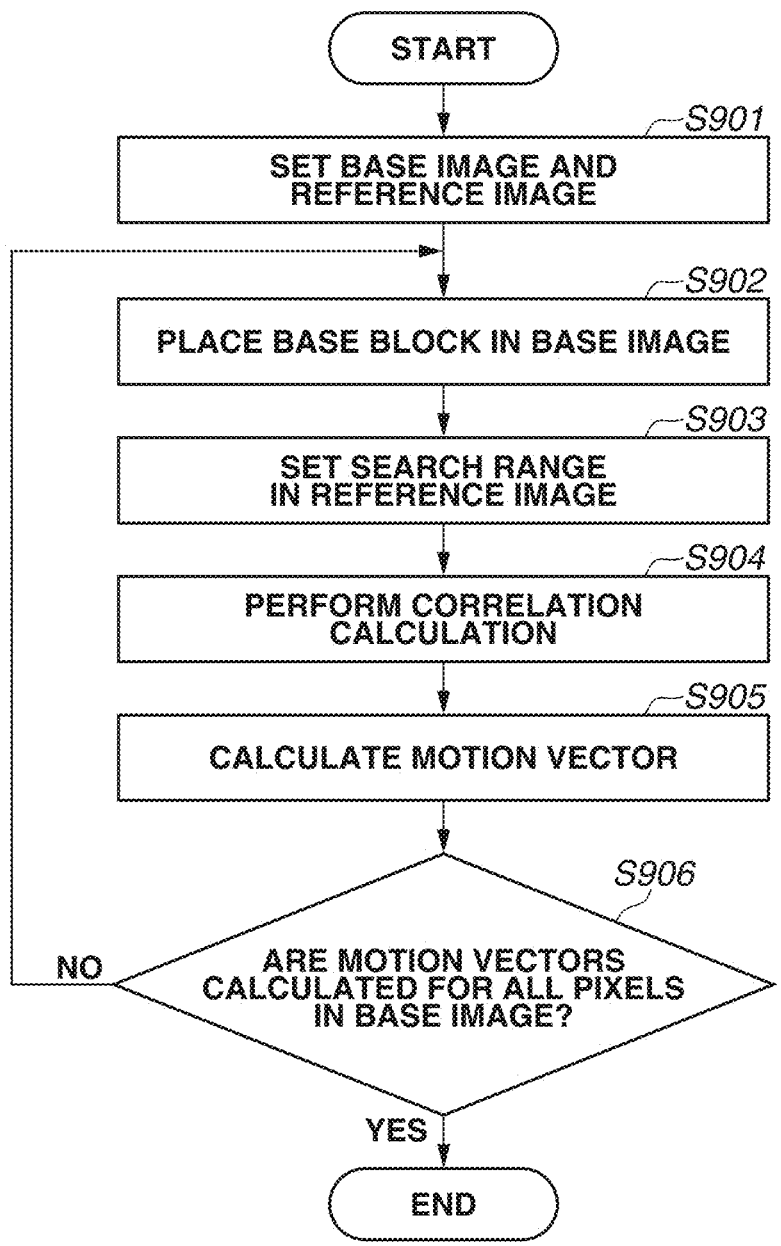
FIG. 9 is a flowchart illustrating a process of calculating motion vectors.

Next, a detailed description will be given of a method for calculating the motion vectors with reference to FIGS. 9 and 6. FIG. 9 is a flowchart illustrating the process of calculating the motion vectors. The following flowchart is achieved by the control unit 112 controlling the components of the camera 101 according to programs stored in the ROM 113. In the present disclosure, the technique for calculating the motion vectors is described taking a block matching method as an example. The technique for calculating the motion vectors, however, is not limited to this example, and may be, for example, a gradient method.

Figure 6:
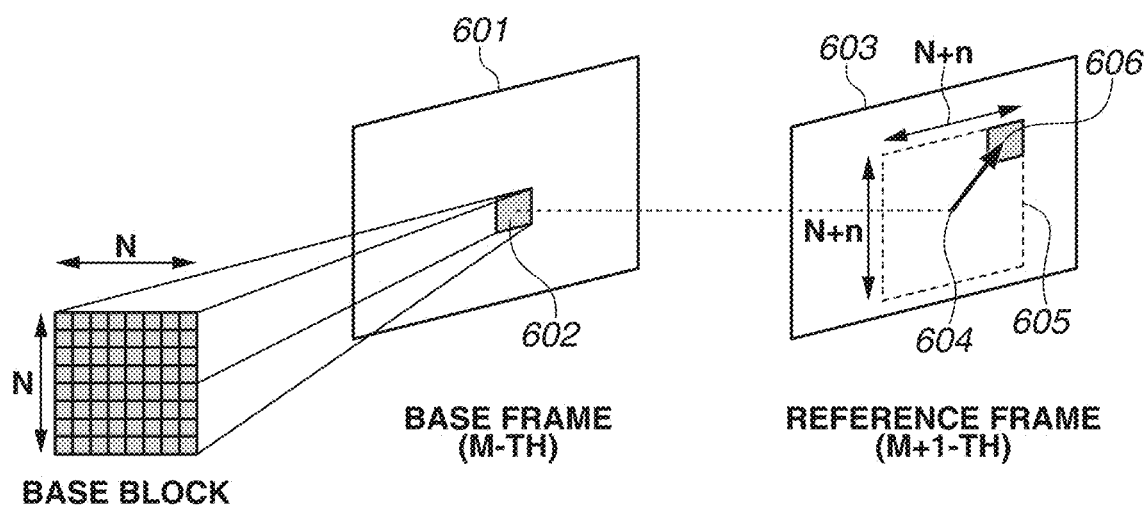
FIG. 6 is a diagram illustrating block matching.

In step S901 in FIG. 9, as illustrated in FIG. 6, two temporally adjacent preliminary imaging images (a preliminary imaging image of an M-th frame and a preliminary imaging image of an M+1-th frame) are input to the image processing unit 124 of the camera 101. Then, the image processing unit 124 sets the preliminary imaging image of the M-th frame as a base frame 601 and sets the preliminary imaging image of the M+1-th frame as a reference frame 603.

In step S902, as illustrated in FIG. 6, in the base frame 601, the image processing unit 124 places a base block 602 of N×N pixels.

In step S903, as illustrated in FIG. 6, in the reference frame 603, the image processing unit 124 sets (N+n)×(N+n) pixels around the same coordinates 604 as the center coordinates of the base block 602 of the base frame 601 as a search range 605.

In step S904, the image processing unit 124 performs a correlation calculation between the base block 602 of the base frame 601 and a reference block 606 of N×N pixels at different coordinates present in the search range 605 of the reference frame 603, thereby calculating a correlation value. The correlation value is calculated based on the sum of absolute differences between frames with respect to the pixels in the base block 602 and the reference block 606.

That is, the coordinates having the smallest value of the sum of absolute differences between frames are the coordinates having the highest correlation value. The method for calculating the correlation value is not limited to the method for obtaining the sum of absolute differences between frames, and for example, may be a method for calculating the correlation value based on the sum of squared differences between frames or a normalized cross-correlation value. The example of FIG. 6 indicates that the reference block 606 has the highest correlation.

In step S905, the image processing unit 124 calculates a motion vector based on the coordinates of the reference block 606 indicating the highest correlation value obtained in step S904. In the example of FIG. 6, in the search range 605 of the reference frame 603, a motion vector is obtained based on the same coordinates 604 corresponding to the center coordinates of the base block 602 of the base frame 601 and the center coordinates of the reference block 606. That is, the distance and the direction from the same coordinates 604 to the center coordinates of the reference block 606 are obtained as the motion vector.

In step S906, the image processing unit 124 determines whether motion vectors have been calculated for all the pixels in the base frame 601. If the image processing unit 124 determines in step S906 that motion vectors have not been calculated for all the pixels (NO in step S906), the processing returns to step S902. Then, in step S902, the base block 602 of N× N pixels is placed about a pixel for which a motion vector has not been calculated in the base frame 601, and then, the processes of steps S903 to S905 are performed similarly to the above. That is, the image processing unit 124 repeats the processes of steps S902 to S905 while shifting the base block 602 in FIG. 6, thereby calculating motion vectors for all the pixels in the base frame 601. The units for calculating a motion vector may be pixel units, or may be units obtained by dividing each image into a predetermined number of divisions. The above process is performed between preliminary imaging images obtained at image capturing times close to each other, thereby calculating a motion vector.

Next, in step S703, the image processing unit 124 calculates a vector corresponding to a main part of the object using the object motion information acquired from the wearable device 102 and the motion vectors of the object obtained by the camera 101.

After the image processing unit 124 identifies the vector corresponding to the main part of the object in which the user wishes to reduce object blur, using the object motion information obtained by the wearable device 102, the image processing unit 124 further performs the process of correcting the motion vector of the object in the corresponding main part. The content of this process will be specifically described with reference to FIGS. 10A, 10B, and 10C.

Figure 10A:
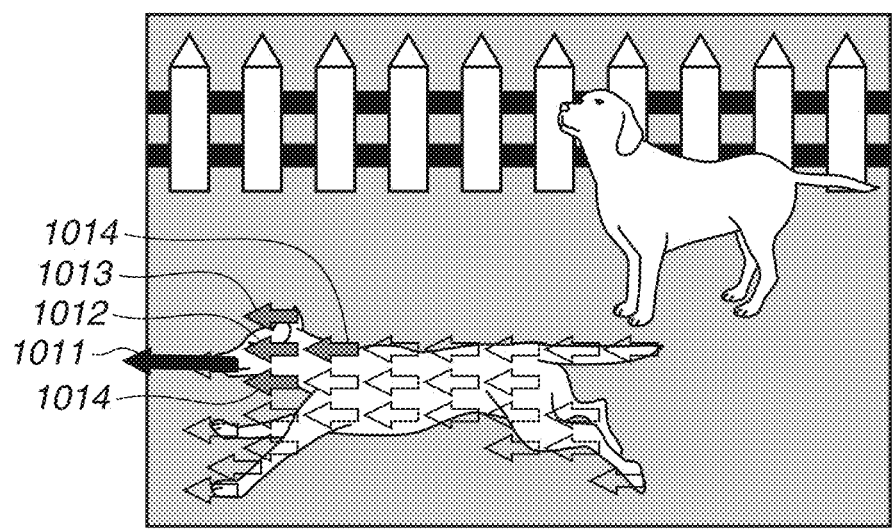

First, to identify the vector corresponding to the main part of the object, the image processing unit 124 finds a group of motion vectors of the object as candidates. This process will be described with reference to FIG. 10A. FIG. 10A is a diagram illustrating a group of motion vectors (1011, 1012, 1013, and 1014) of the object as candidates for the vector corresponding to the main part. Main part information is the attached part information regarding the wearable device 102 included in the object motion information transmitted in step S504. The correspondence between the main part of the object and the motion vectors of the object is achieved by the image processing unit 124 selecting motion vectors of the object corresponding to the main part from among the preliminary imaging images from which the motion vectors of the object are obtained. As the method for detecting the main part from the preliminary imaging images, a technique such as a general object recognition technique may be used. For example, in a case where the attached part to which the wearable device 102 is attached is the head of a dog, the image processing unit 124 detects the head of the dog to which the wearable device 102 is attached in the range where the motion vectors of the object in the preliminary imaging images have been obtained. Then, the image processing unit 124 selects a group of motion vectors (1011, 1012, 1013, and 1014) of the object present within a predetermined distance from the region of the detected head of the dog, further detects the motion vector (1011) of the object having the greatest motion amount among the group of motion vectors, and determines the detected motion vector as the motion vector of the object in the main part.

Next, a detailed description will be given of the process of correcting the motion vector of the object in the corresponding main part with reference to FIGS. 10B and 10C. The correction of the motion vector of the object in the main part refers to the process of correcting the motion vector of the object using the acceleration information regarding the attached part transmitted from the wearable device 102, in which the output update rate is fast, in a motion vector calculation process, in which the output update rate is slow, thereby improving the update rate of the motion vector of the object in a simulated manner and obtaining the motion vector of the object corresponding to a change in the motion of the object.

FIG. 10B is a diagram illustrating the motion vector of the object and the acquisition timing of the object motion information.

The motion vector of the object is used to obtain the amount of movement of the object between preliminary imaging images of two or more chronologically successive frames using the preliminary imaging images. For example, to obtain a motion vector 1031 of the object, the motion vector 1031 of the object cannot be obtained until the camera 101 acquires at least two frames, namely preliminary imaging images 1021 and 1022. To obtain a next motion vector 1032 of the object, the motion vector 1032 of the object cannot be calculated until the camera 101 acquires a preliminary imaging image 1023. If the motion of the object suddenly changes during a blank period 1041 from when the motion vector 1031 of the object is calculated to when the motion vector 1032 of the object is calculated, the motion of the object at this timing cannot be correctly detected because the update rate of the motion vector of the object is slow. On the other hand, the acceleration information as the object motion information detected by the wearable device 102 does not depend on preliminary imaging images, and enables direct detection of the motion of the device 102. Thus, generally, the motion of the object can be detected at high speed (1051).

The frame rate of preliminary imaging images that can be acquired by a digital camera, which is a general camera 101, is about 120 fps even at high speed. Thus, the update rate of the motion vector of the object is less than or equal to 120 fps. On the other hand, the output update rate of the acceleration sensor 146 mounted on a smartphone, which is a general wearable device 102, is greater than or equal to 10 to 100 times the output update rate of the motion vector of the object.

Thus, the image processing unit 124 corrects the motion vector of the object using the acceleration information detected by the wearable device 102, whereby the motion vector of the object having high accuracy can be obtained even during a period when the motion vector of the object is not updated. There is a case where the motion vector of the object cannot be obtained if the object has a low contrast or accumulation blur or defocus occurs in an image. That is, there is a case where the camera 101 alone cannot acquire motion information regarding the object, and there is a possibility that the update rate of the motion vector of the object becomes slow. Thus, the correction and the update of the motion vector of the object using sensor information obtained by the wearable device 102, the update rate of which is fast, are effective.

Next, the process of correcting the motion vector of the main part will be described with reference to FIG. 10C. FIG. 10C illustrates a motion vector 1061 of the object in the main part, a motion vector 1062 of the object corrected when the motion of the object becomes slow before the motion vector of the object is updated, and a motion vector 1063 of the object corrected when the motion of the object becomes fast.

The motion vector of the main part in the images has an angle and magnitudes in a plurality of directions and therefore is converted into the magnitude of a vector using formula 1. Generally, a motion vector used in an image has a directionality in a two-dimensional coordinate system, and therefore can be converted as a scalar into the magnitude of a vector by applying formula 1.

$$\text{magnitude of vector} = \sqrt{(\text{magnitude in } x - \text{direction})^2 + (\text{magnitude in } y - \text{direction})^2} \quad \text{formula 1}$$

The method for correcting the motion vector of the object can be achieved by performing a gain process corresponding to a change in the acceleration of the main part up to the time when the motion vector of the object is updated. Thus, if the amount of change in the acceleration calculated using the acceleration information regarding the main part detected by the wearable device 102 is a (1 if the acceleration does not change), the correction of the motion vector of the object can be represented by formula 2.

$$\text{motion vector of object after correction} = \alpha \times \text{motion vector of object} \quad \text{formula 2}$$

In a case where the motion vector of the object in the main part is corrected using the above formula 1, and if the amount of change in the acceleration a is smaller than 1, the motion vector of the object before correction is converted to the motion vector 1062. Conversely, if the amount of change in the acceleration a is greater than 1, the motion vector of the object before correction is converted to the motion vector 1063. Such a correction of the motion vector of the object is performed, thereby obtaining the blur amount of the main part to minimize the difference in time from the real-time motion of the object.

Next, in step S704, according to an instruction from the control unit 112, a blur amount estimation unit (not illustrated) of the camera 101 estimates the motion blur amount of motion blur that occurs in the object based on the motion vector of the object in the main part calculated in the process of the above step and the shutter speed set by the user. The motion blur amount of the object is calculated by the following formula using the image capturing frame rate of the preliminary imaging images from which the motion vector of the object is calculated, the shutter speed set in the camera 101 by the user, and the motion vector of the object.

$$\text{motion blur amount of object} = \text{motion vector of object} * (\text{frame rate (fps)/shutter speed(s)}) \quad \text{formula 3}$$

Figure 11:
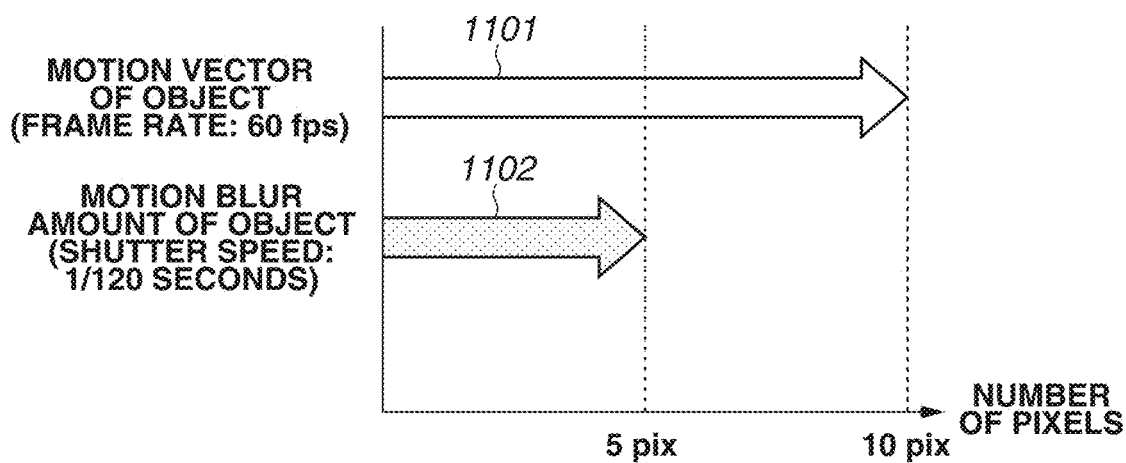
FIG. 11 is a diagram illustrating a relationship between the motion vector of the object and a motion blur amount of the object.

The relationship between the motion vector of the object and the motion blur amount of the object in the above formula 3 will be described with reference to FIG. 11. FIG. 11 is a diagram illustrating the relationship between the motion vector of the object and the motion blur amount of the object. For example, the motion vector of the object is calculated using temporarily adjacent frames of preliminary imaging images that are updated at a frame rate of 60 fps, and therefore, the update frame rate of a motion vector 1101 of the object is also 60 fps. On the other hand, the motion blur amount of the object is the blur amount of the motion of the object during exposure and therefore corresponds to the shutter speed set by the user. For example, if the user sets the shutter speed to $\frac{1}{120}$ seconds, the time between the temporarily adjacent frames of preliminary imaging images from which the motion vector of the object is obtained is $\frac{1}{60}$ seconds. Thus, if the motion vector 1101 of the object is 10 pixels, a length of half 10 pixels, namely 5 pixels, is a motion blur amount 1102 of the object.

Next, in step S705, the camera 101 compares the motion blur amount of the object calculated in step S704 and an acceptable motion amount, changes the shutter speed of a preliminary imaging image to be captured next to obtain a blur amount of the object less than or equal to the acceptable motion amount, and changes the image capturing conditions of preliminary imaging images.

The acceptable motion amount refers to a motion blur amount that falls within a range where the motion blur is not conspicuous as motion blur in a case where image capturing is performed at a predetermined shutter speed. The magnitude of the acceptable motion amount is determined based on the size and the number of pixels of the image sensor such as a CCD or CMOS sensor, and the resolution of the display that displays the image. For example, suppose that the image sensor is an APS-C image sensor, the number of pixels of the image sensor is 20 megapixels, and the acceptable motion amount of a personal computer (PC) display with full high-definition (HD) (1920×1080 pixels) is less than or equal to 5 pixels. In order for the camera 101 to capture a preliminary imaging image to obtain a motion blur amount less than or equal to the acceptable motion amount, the shutter speed is determined using the following formulas 4 and 5.

$$n = \text{motion blur amount of object/acceptable motion amount} \qquad \text{formula 4}$$

At this time, if n obtained by formula 4 is greater than 1, this indicates that if image capturing is performed at the currently set shutter speed, there is a high possibility that object blur occurs. If n is less than or equal to 1, this means that there is a low possibility that object blur occurs at the shutter speed. Thus, an appropriate shutter speed at which object blur is less likely to occur is calculated using the following formula 5.

$$\text{update shutter speed(s)} \leq \text{setting shutter speed(s)} \ast 1/n \qquad \text{formula 5}$$

To describe this using specific numerical values, the motion blur amount 1102 in FIG. 11 is 5 pixels, and the acceptable motion amount is also 5 pixels. Thus, n=1 is obtained by formula 4, and it is understood that the currently set shutter speed is less likely to be influenced by object blur. Thus, the shutter speed as an image capturing condition of preliminary imaging images (an image capturing condition for actual exposure if the image capturing condition remains unchanged) should be set to an exposure time faster than $1/120$ s (the shutter speed is not changed from $1/120$ s in this case) by formula 5. If there is a sufficient amount of light for image capturing, the shutter speed may further be set to be faster than $1/250$ s in view of the ISO sensitivity or the stop.

A description has been given above of an example where the shutter speed as an image capturing condition of preliminary imaging images is updated. To further increase the accuracy of detecting the motion vector of the object, the frame rate for capturing preliminary imaging images may be increased, thereby making the update rate for calculating the motion vector of the object fast. A condition for making the update rate fast is as follows.

$$\text{update frame rate (fps)} \geq \text{setting frame rate (fps)} \ast n \qquad \text{formula 6}$$

The above frame rate and the shutter speed are image capturing conditions important to perform motion detection. To capture an image with appropriate brightness, the stop value and the ISO sensitivity are also changed according to a change in the frame rate or the shutter speed, thereby controlling the exposure value not to change.

Regarding the detailed process of step S303, the process of determining the image capturing conditions of preliminary imaging images (the same image capturing conditions are maintained also in main imaging if the image capturing conditions remain unchanged) has been described using the processes of steps S701 to S705 in FIG. 7.

The processing of the imaging system 100 according to the first exemplary embodiment has been described above. Specifically, object motion information is sensed through the wearable device 102. Then, using the object motion information acquired by the wearable device 102 as auxiliary information, a motion vector of an object is updated, and the image capturing conditions of the camera 101 are determined. According to the present exemplary embodiment, in cooperation with the wearable device 102, it is possible to increase the accuracy of detecting a motion vector of an object calculated by the camera 101 and set a shutter speed that reduces object blur. Consequently, without touching a camera, a photographer can set the shutter speed to reduce the motion of an object desired by the photographer to less than or equal to desired blur and adjust the exposure of image capturing. According to the present disclosure, it is possible to expand the use scene of auto image capturing.

In the first exemplary embodiment, a description has been given of the method for calculating the motion blur amount by converting the motion vector of the object according to the shutter speed set by the user. The motion blur amount may not be calculated by converting the motion vector of the object according to the shutter speed. For example, the motion vector of the object is compared with a threshold set in advance, and if the motion vector of the object exceeds the threshold, the shutter speed is changed to a value faster than the current setting value, whereby it is possible to achieve a similar process in a similar manner.

In the first exemplary embodiment, the method for identifying a main part of an object and selecting a motion vector of the object in the main part has been described. From among motion vectors of the object obtained from preliminary imaging images, a motion vector of the object corresponding to the fastest motion may be selected.

In the first exemplary embodiment, the method for identifying a main part of an object and selecting a motion vector of the object in the main part has been described. In a case where an acceleration sensor similar to the acceleration sensor 146 mounted on the wearable device 102 is mounted on the camera 101, a motion vector of the object other than the motion of the acceleration sensor mounted on the camera 101 may be selected. The acceleration sensor mounted on the camera 101 can obtain motion information regarding the main body of the camera 101 obtained by moving the camera 101. Thus, a motion vector different from this motion information is selected, whereby it is possible to screen out motion information other than that regarding a main motion object.

In the first exemplary embodiment, the method for identifying a main part of an object and selecting a motion vector of the object in the main part has been described. From among calculated motion vectors of the object, a motion vector of the object in a range that appears in the center of the angle of view when the camera 101 performs image capturing, or near an autofocus target region in the image may be selected.

In the first exemplary embodiment, the method for identifying a main part of an object and selecting a motion vector of the object in the main part has been described. In a case where the wearable device 102 appears in a preliminary imaging image, the position of the wearable device 102 may be directly detected from the image.

Alternatively, before the motion vector of the object in the main part is selected, a sorting process may be performed on motion vectors of the object obtained from preliminary imaging images. For example, in calculation such as template matching performed in the process of obtaining the motion vectors of the object, a correlation value is calculated. At this time, a vector having a correlation value lower than a threshold set in advance is determined as a motion vector of the object having low reliability (reliability less than or equal to a threshold). Consequently, it is possible to extract only a motion vector of the object having a correlation value greater than or equal to the threshold (reliability greater than or equal to the threshold) and having higher accuracy.

Next, a second exemplary embodiment of the present disclosure will be described in detail with reference to the drawings.

In the second exemplary embodiment, exposure is controlled based on the motion blur amount of the object during a main exposure process, whereby it is possible to acquire an image in which the motion blur amount of the object is reduced. The processing performed by the wearable device 102 of the imaging system 100 according to the second exemplary embodiment is similar to that according to the first exemplary embodiment, and therefore is not described. With reference to flowcharts in FIGS. 4 and 13, a description will be given of the operation performed by the control unit 112 of the camera 101, which is the feature of the second exemplary embodiment. In the following processing, as the imaging system 100, the camera 101 is achieved by the control unit 112 controlling the components of the apparatus according to programs stored in the ROM 113. The wearable device 102 is achieved by the control unit 138 controlling the components of the apparatus according to programs recorded in the ROM 151. The processes of steps similar to those in the first exemplary embodiment are designated by the same signs, and are not described in detail.

First, the image capturing operation of the camera 101 will be described with reference to FIG. 4. The processes of steps S301 to S305 in FIG. 4 are similar to the processes of steps S301 to S305 in FIG. 3 in the first exemplary embodiment, and therefore are not described. The second exemplary embodiment is different from the first exemplary embodiment in a main exposure process in step S401.

In step S401, based on the motion blur amount of the part of interest of the object during exposure, the camera 101 performs the process of discontinuing the exposure and performs image capturing by reducing the occurrence of object blur.

Next, with reference to the flowchart in FIG. 13, a detailed description will be given of control of the main exposure process in step S401 performed by the control unit 112 of the camera 101 based on the motion blur amount of the part of interest of the object during exposure.

Figure 13:
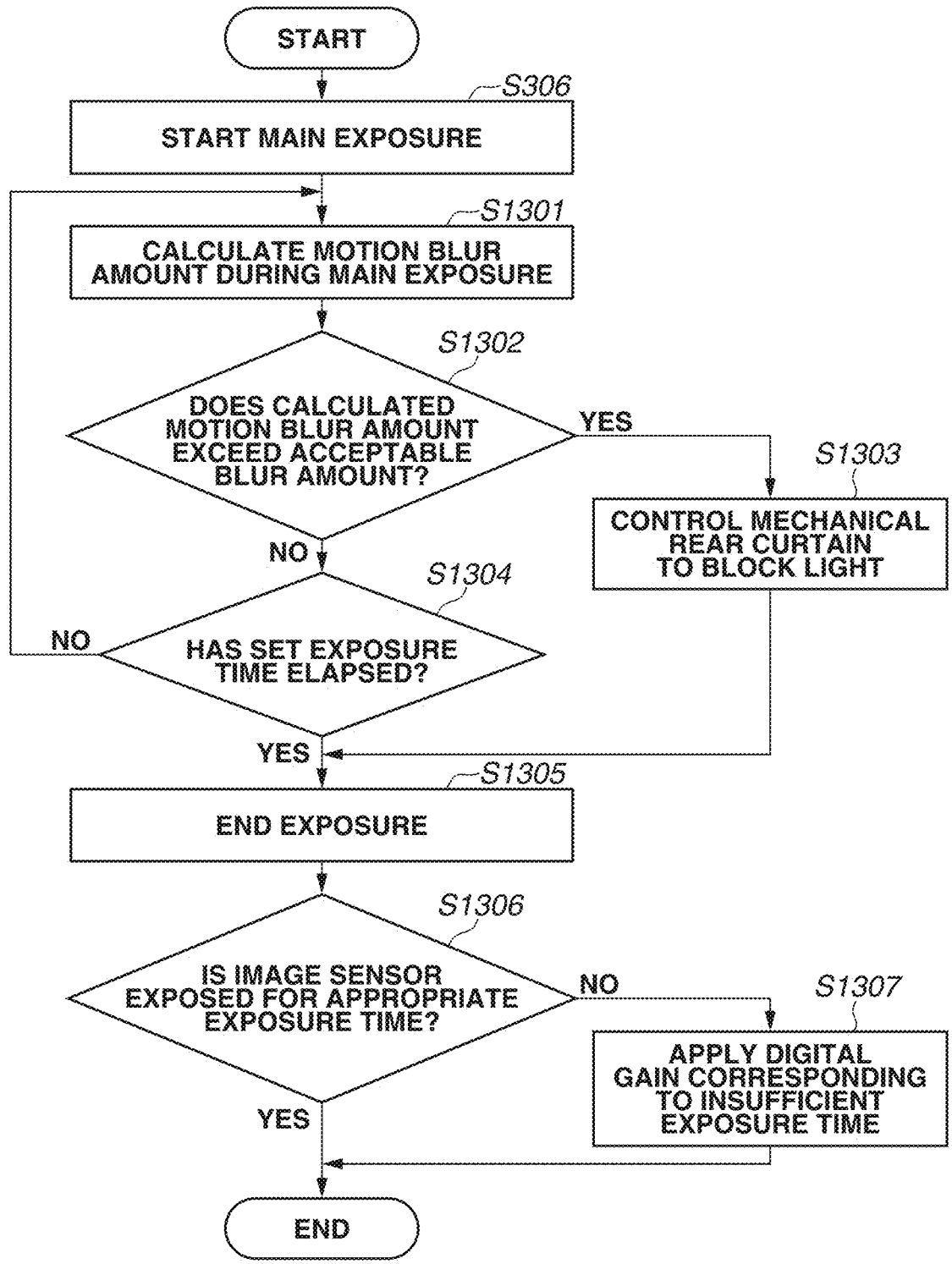
FIG. 13 is a flowchart illustrating details of a main exposure process according to the second exemplary embodiment.

In step S306 in FIG. 13, similarly to step S306 in the first exemplary embodiment, the camera 101 starts a main exposure process.

A detailed description will be given of the configuration of the electronic front curtain shutter and the image capturing operation when the main exposure process is specifically performed, with reference to FIGS. 14 and 15.

Figure 14:
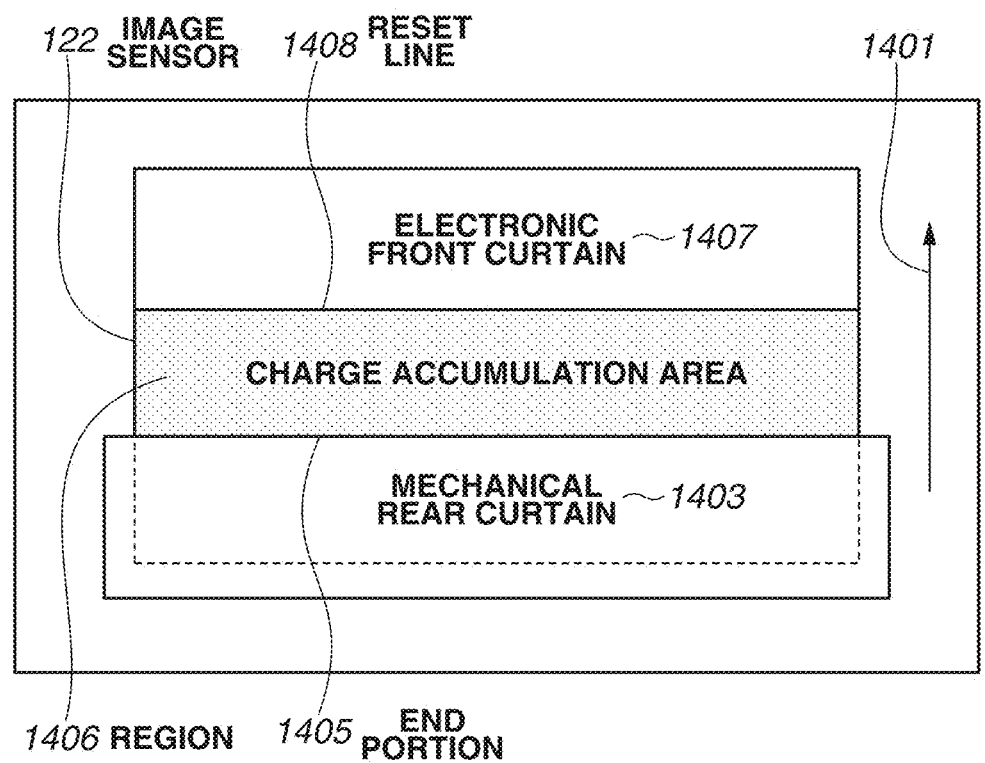
FIG. 14 is a diagram illustrating a configuration of an electronic front curtain shutter.

FIG. 14 is a front view illustrating the state where the image sensor 122 and a mechanical rear curtain 1403 are viewed along the optical axis direction from the lens side. FIG. 14 illustrates the state where reset scanning and the running of the mechanical rear curtain 1403 performed by the image sensor 122 after image capturing is started are in the middle. An arrow 1401 indicates the scanning direction of the reset scanning (the running direction of an electronic front curtain 1407) and the running direction of the mechanical rear curtain 1403. FIG. 14 illustrates the state where the mechanical rear curtain 1403 composed of the mechanical shutter 118 in FIG. 1 shields a partial region of the image sensor 122 from light. Further, a reset line 1408 is a line of the reset scanning performed by the image sensor 122 (a reset line) and corresponds to an end portion of the electronic front curtain 1407 as a portion where the operation of resetting the amounts of accumulated charge of pixels to zero is performed. A region 1406 formed by a slit between the reset line 1408 and an end portion 1405 of the mechanical rear curtain 1403 is controlled to shift in the direction of the arrow 1401 according to the running of the electronic front curtain 1407 and the mechanical rear curtain 1403. The time from when the reset line 1408 passes, i.e., the time when pixels are sequentially reset with respect to each line in the direction of the arrow 1401, to the time when light is blocked by the mechanical rear curtain 1403 is a charge accumulation time based on the exposure of the pixels. As described above, charge accumulation with respect to each line is started by the reset line 1408 running in the direction of the arrow 1401, and therefore, the start timing of the charge accumulation differs with respect to each line of the image sensor 122.

Figure 15A:
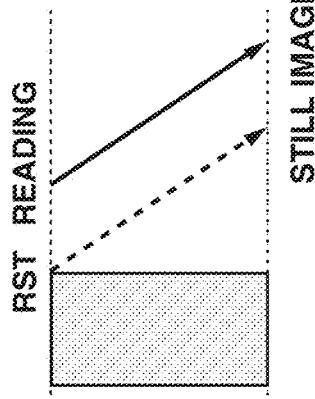
FIGS. 15A and 15B are diagrams illustrating an operation of the electronic front curtain shutter.
Figure 15B:
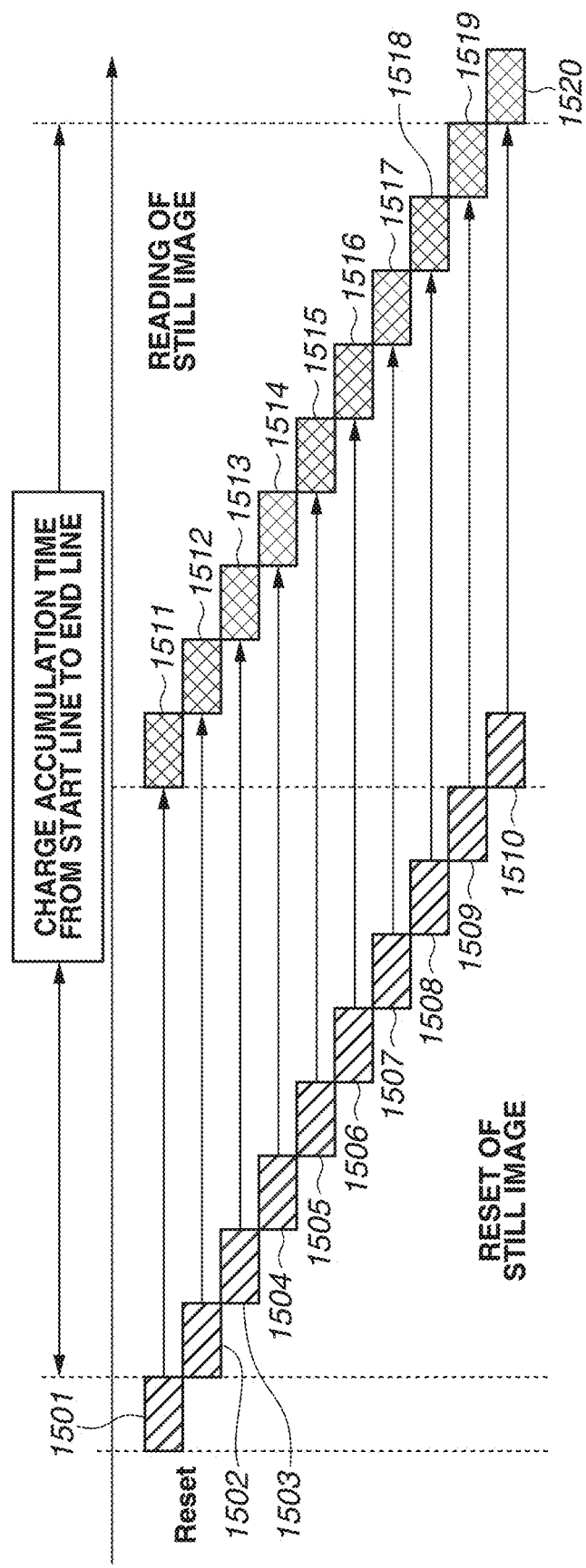

The timing of the charge accumulation will be described in detail with reference to FIGS. 15A and 15B. FIG. 15A is a conceptual diagram illustrating the reset of a charge and the start of reading of the charge. FIG. 15B is a timing diagram illustrating the reset of a charge and the reading of the charge with respect to each line. Lines 1501 to 1510 in FIG. 15B indicate the timing when a charge is subjected to a reset process with respect to each line. First, in the line 1501 in an end portion, the operation of reading a charge and then resetting the charge is performed. Conversely, the line 1510 in an end portion is a line where a charge is reset last. As described above, the timing of reset is controlled with respect to each line. Since the timing of reset differs with respect to each line, the control unit 112 controls the charge accumulation times to be the same among all the lines, and also controls the charge reading times so that the exposure times are the same with respect to each line among lines 1511 to 1520.

In step S1301 in FIG. 13, the control unit 112 corrects the motion vectors of the object detected in step S303 in FIG. 4 and calculated by the image processing unit 124 of the camera 101 immediately before the main exposure. The correction of the motion vectors of the object is performed based on the output of the acceleration sensor 146 included in the object motion information from the wearable device 102 during the exposure. When the main exposure starts, the camera 101 cannot capture a preliminary imaging image unless a plurality of image sensors 122 is present. Thus, the motion vectors of the object cannot be updated during the main exposure. Thus, in this step, estimation is performed on the motion vectors of the object in the part of interest calculated up to immediately before the main exposure. In the estimation, the motion vector of the object in the main part corresponding to the process of step S703 in the first exemplary embodiment is corrected using the acceleration information acquired from the acceleration sensor 146, and then, the process of converting the motion vector into the motion blur amount is performed. By the above process, it is possible to estimate the motion blur amount even during the main exposure of the camera 101.

In step S1302, the control unit 112 of the camera 101 determines whether the motion blur amount estimated in step S1301 exceeds the acceptable motion amount. If the motion blur amount exceeds the acceptable motion amount (YES in step S1302), the processing proceeds to step S1303. If, on the other hand, the motion blur amount does not exceed the acceptable blur amount (NO in step S1302), the processing proceeds to step S1304.

In step S1304, the control unit 112 of the camera 101 determines whether the image capturing conditions obtained in step S303 in FIG. 4 are satisfied. The control unit 112 of the camera 101 mainly determines whether the image capturing conditions influence accumulation blur during the exposure. This determination can be made based on whether the exposure time corresponding to the shutter speed set before the main exposure is satisfied. If the image capturing conditions are satisfied (YES in step S1304), the processing proceeds to step S1305. In S1305, the exposure is ended.

In step S1303, the control unit 112 of the camera 101 determines that if the exposure continues any longer in the image sensor 122, object blur will occur in an image. Then, the control unit 112 of the camera 101 closes the mechanical shutter 118 faster than the exposure time set in the image capturing conditions. Consequently, the entry of light into the image sensor 122 is blocked. Next, the processing proceeds to step S1305. In S1305, the exposure is ended. The method for performing the exposure termination control in step S1303 will be described in detail with reference to FIG. 16.

Figure 16:
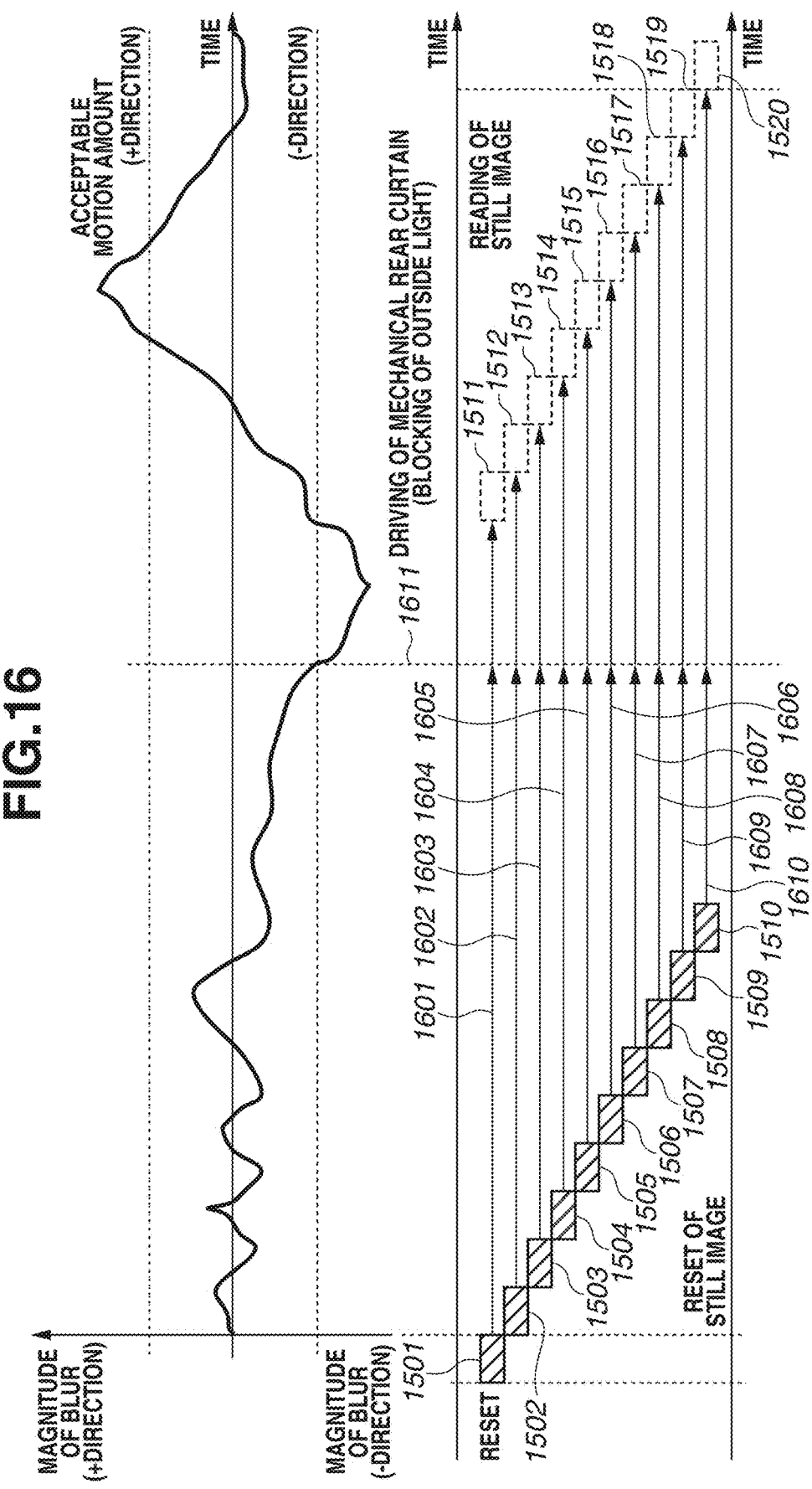
FIG. 16 is a diagram illustrating a method for performing exposure termination control.

FIG. 16 illustrates a timing chart of the process in which, in a case where the motion blur amount of the object exceeds the acceptable motion amount (the acceptable threshold) during the main exposure process, the control unit 112 of the camera 101 controls the mechanical rear curtain to discontinue the exposure. In a case where the situation where object blur is likely to occur in an image during the main exposure arises, the control unit 112 of the camera 101 controls the mechanical rear curtain to control the exposure time, thereby achieving a reduction in object blur.

The lines 1501 to 1510 in FIG. 16 (the same image capturing conditions as those in FIG. 15B) are reset lines. After a reset process on the line 1501 is started, outside light reaches the image sensor 122, and the accumulation of charges is started. If accumulation blur does not occur in an image by the motion of the main body of the camera 101 during the exposure, charges are accumulated up to the lines 1511 to 1520 on which a next reset process is performed (the same image capturing conditions as those in FIG. 15B). A description will be given of a method for, in a case where the motion blur amount of the object exceeds the acceptable motion amount during the exposure, controlling the accumulation of charges.

The control unit 112 executes a reset process on the beginning reset line 1501 in FIG. 16 and starts exposure. At this time, if the motion blur amount of the object becomes great, and the control unit 112 detects that the motion blur amount of the object exceeds the acceptable threshold at a timing 1611 in FIG. 16, the control unit 112 drives the mechanical rear curtain to close the mechanical shutter 118 so that outside light does not reach the image sensor 122. By the action of the mechanical shutter 118, times 1601 to 1610 in FIG. 16 are actual exposure times. That is, during the times 1601 to 1610 and times corresponding to the lines 1511 to 1520, the image sensor 122 is not exposed, and therefore, charges are not accumulated in the image sensor 122. Thus, it is possible to prevent object blur that occurs due to the motion of the object. Although the accumulation of charges is stopped by controlling the mechanical shutter 118, in a shutter on which the mechanical shutter 118 is not mounted, the pulse generation unit 126 generates a reset pulse, thereby discontinuing the accumulation of charges, whereby it is possible to achieve a similar process.

Next, in step S1306 in FIG. 13, the control unit 112 determines whether the set exposure time has elapsed. If it is determined that the set exposure time has not yet elapsed (NO in step S1306), the processing proceeds to step S1307.

In step S1307, the control unit 112 performs signal processing for, in order for image data acquired with the insufficient exposure time to have brightness according to the normal exposure time, applying digital gain corresponding to the difference between the insufficient exposure time and the normal exposure time to the acquired image data. The digital gain is obtained from the difference between the exposure times by the following formula.

digital gain=exposure time set when image capturing is started/(exposure time set when image capturing is started−time from start of exposure to turning off of mechanical shutter)  formula 7

The digital gain calculated by formula 7 is applied to the image data, thereby correcting the brightness of the image data to the brightness corresponding to the expected exposure time. To perform gain correction more exactly, the digital gain may be calculated with respect to each horizontal line of the image data, and the digital gain with respect to each horizontal line may be applied to the image data.

If, on the other hand, the set exposure time has elapsed (YES in step S1306), the control unit 112 reads a charge with respect to each line and performs a charge reset process from a line in which the reading of the charge is completed, thereby ending the exposure of the camera 101 and acquiring the image data.

Figure 12:
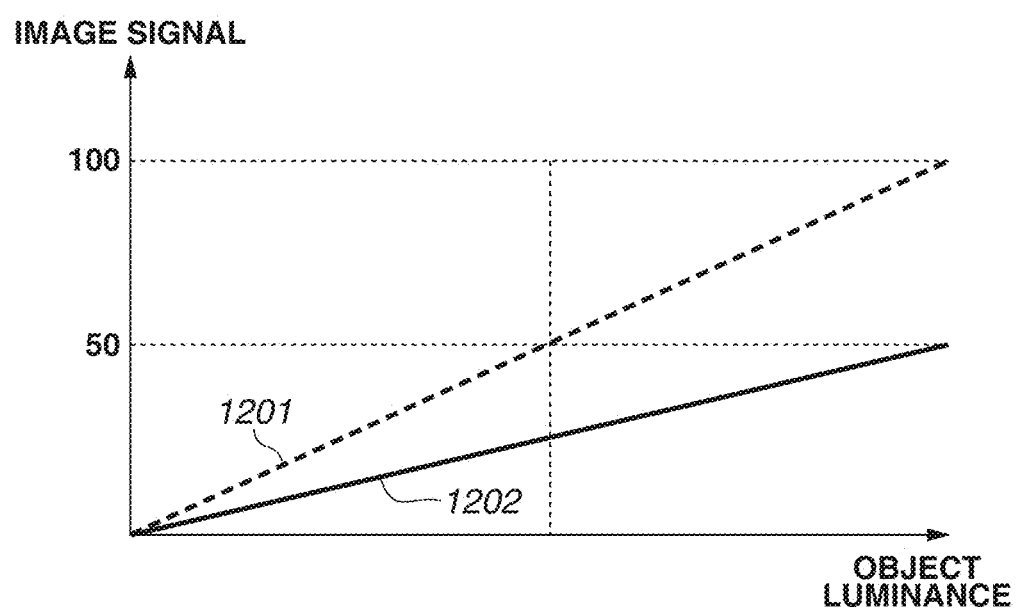
FIG. 12 is a diagram illustrating a process of correcting an amount of exposure by applying digital gain.

Next, with reference to FIG. 12, a detailed description will be given of the process of correcting the insufficient amount of exposure performed by the image processing unit 124 in step S1307. As an example, an image signal 1201 in FIG. 12 indicates an image signal when image capturing is performed with a target amount of exposure. An image signal 1202 indicates an image signal when the exposure time is insufficient and the amount of exposure does not reach the target amount of exposure because the exposure is discontinued in the middle. In FIG. 12, the horizontal axis represents the object luminance, and the vertical axis represents the image signal level corresponding to the object luminance on the horizontal axis. For example, the image signal 1202 is an image signal in a case where image capturing is performed with half the exposure time of the image signal 1201 when image capturing is performed with the target amount of exposure. Generally, the amount of exposure when the camera 101 performs image capturing is determined based on the F-number, the ISO sensitivity, and the shutter speed (the exposure time). Thus, the discontinuation of the exposure in the middle makes the amount of exposure insufficient compared to the target amount of exposure by an amount corresponding to the shortening of the exposure time. If the exposure time halves, the amount of exposure halves. Thus, by applying a digital gain of 2 times, it is possible to adjust the image signal 1202 to the same amount of exposure as that of the image signal 1201. Thus, it is possible to acquire the normal target amount of exposure. The above correction process is performed in line units of the image sensor 122, whereby, even when the exposure is discontinued, it is possible to capture the object with brightness corresponding to the normal target amount of exposure.

The method in which, during exposure, the imaging system 100 according to the second exemplary embodiment controls the exposure based on the magnitude of blur of the object has been described with reference to the flowchart in FIG. 13. By these processes, even in the situation where it is difficult to change the shutter speed during exposure, the exposure time is controlled, whereby it is possible to acquire an image in which object blur is reduced.

Next, a third exemplary embodiment of the present disclosure will be described in detail with reference to the drawings.

Figure 17:
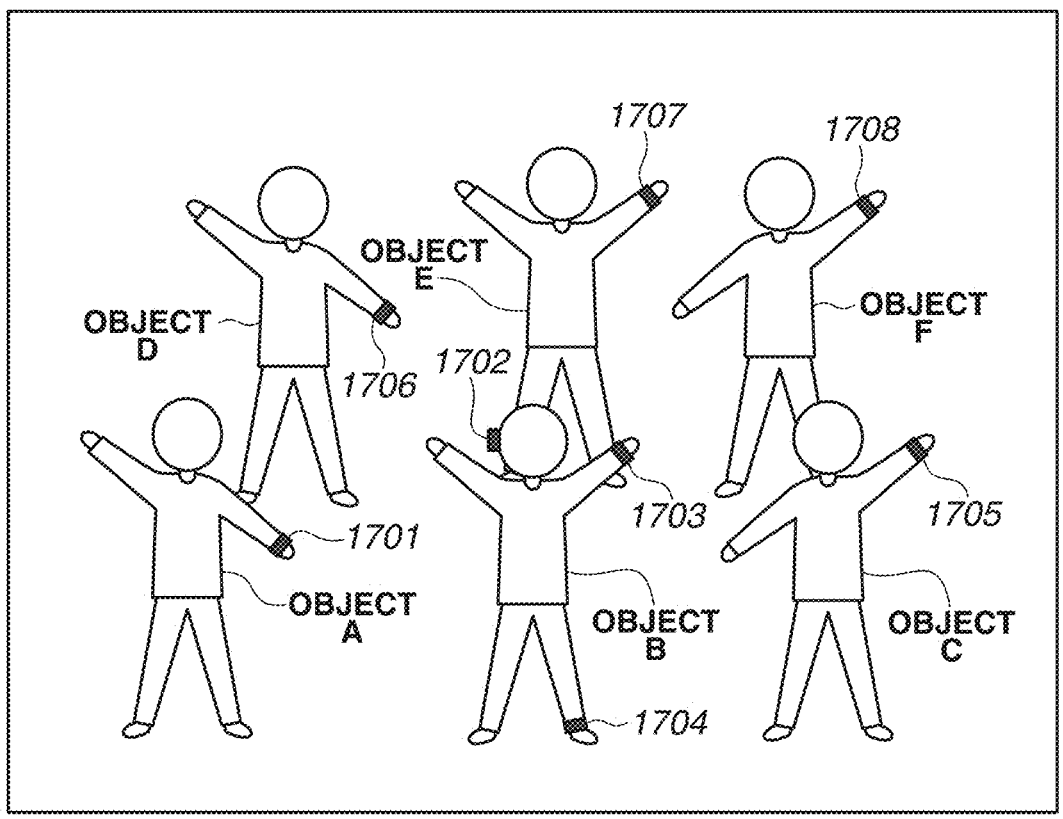
FIG. 17 is an image diagram in a case where an object is a plurality of people.

In the third exemplary embodiment, a plurality of people as objects as image capturing targets wears wearable devices 102, and a configuration in which the camera 101 is set outside the wearable devices 102 is employed. FIG. 17 illustrates an example of the scene where the plurality of people as the objects wears the wearable devices 102. FIG. 17 illustrates an example where six people as objects, namely objects A to F, wear wearable devices 102 as wearable devices 1701 to 1708. In this example, the object A wears the wearable device 102 as the wearable device 1701, the object B wears the wearable devices 102 as the wearable devices 1702, 1703, and 1704, the object C wears the wearable device 102 as the wearable device 1705, the object D wears the wearable device 102 as the wearable device 1706, the object E wears the wearable device 102 as the wearable device 1707, and the object F wears the wearable device 102 as the wearable device 1708. Object motion information regarding each object is sensed via these wearable devices 102, and the image capturing conditions of the camera 101 are determined using the acquired object motion information as auxiliary information. The processing performed by each wearable device 102 of the imaging system 100 according to the third exemplary embodiment is similar to that according to the first exemplary embodiment, and therefore is not described. A description will be given of the operation performed by the control unit 112 of the camera 101, which is a characterizing feature of the third exemplary embodiment, with reference to a flowchart in FIG. 18.

In the following processing, as the imaging system 100, the camera 101 is achieved by the control unit 112 controlling the components of the apparatus according to programs stored in the ROM 113. Each wearable device 102 is achieved by the control unit 138 controlling the components of the apparatus according to programs recorded in the ROM 151. The processes of steps similar to those in the first exemplary embodiment are designated by the same signs, and are not described in detail.

Figure 3:
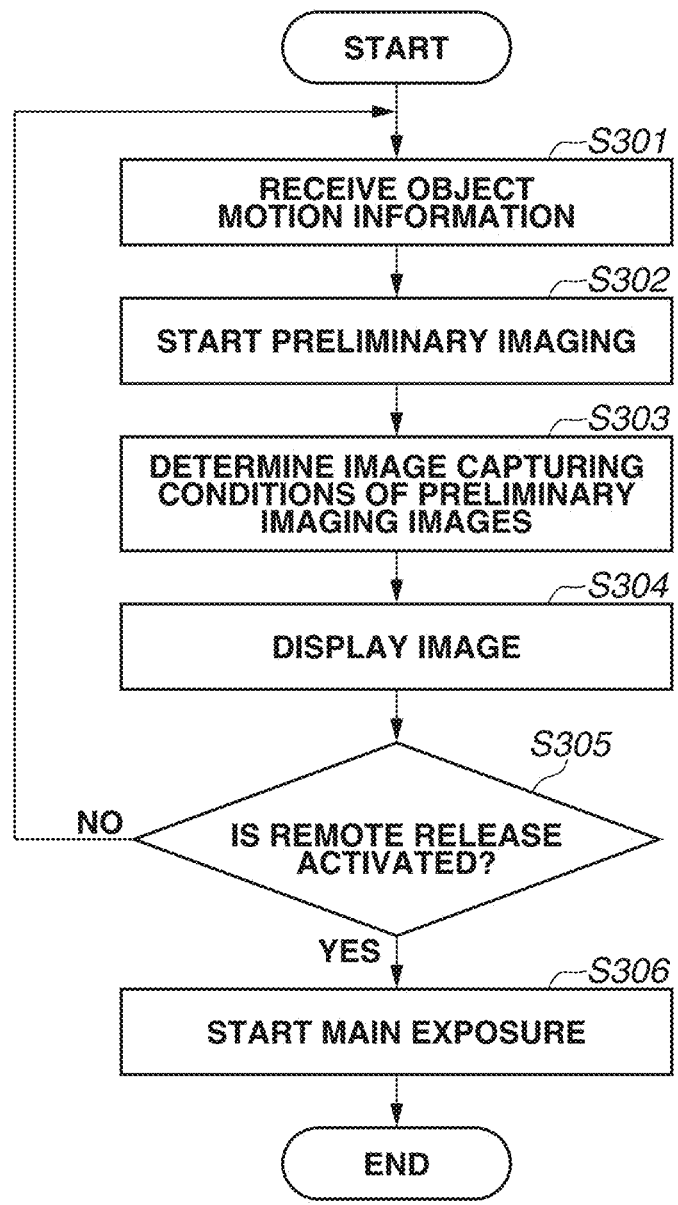
FIG. 3 is a flowchart illustrating an operation of a camera according to a first exemplary embodiment.
Figure 4:
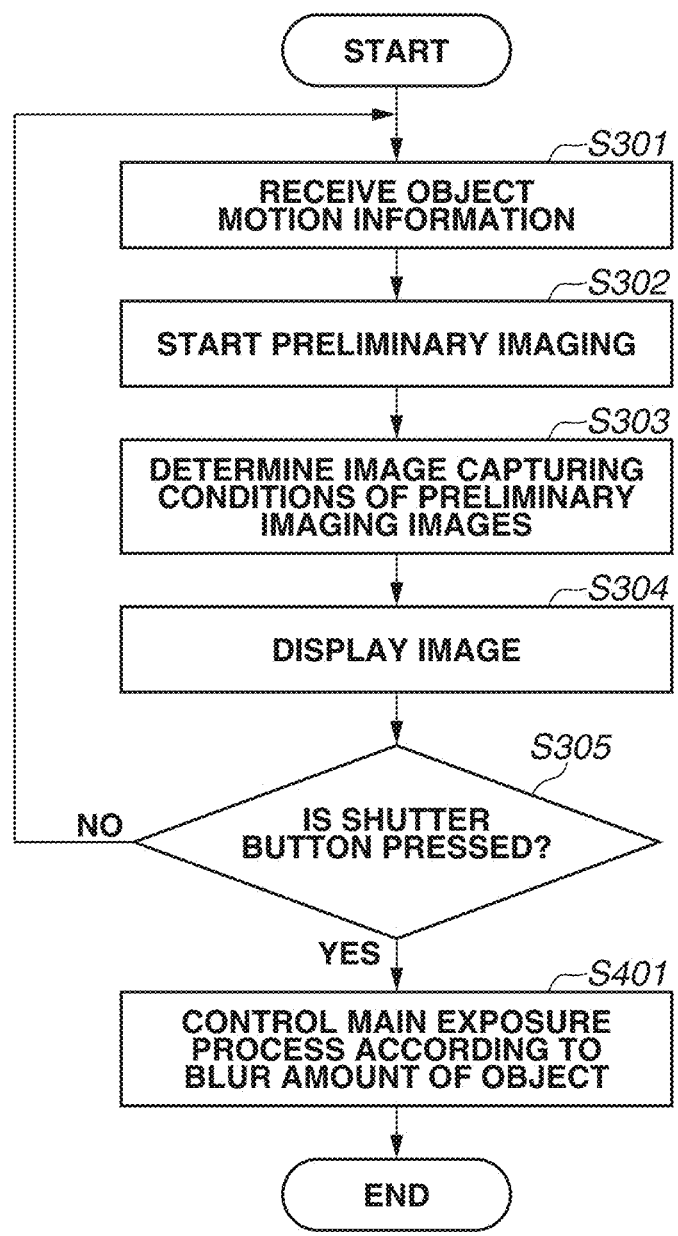
FIG. 4 is a flowchart illustrating an operation of a camera according to a second exemplary embodiment.

The image capturing operation of the camera 101 is similar to that in the processes of steps S301 to S306 in FIG. 3 in the first exemplary embodiment, and therefore is not described. Although the process of step S303, which is the characterizing feature of the third exemplary embodiment, will be described with reference to the flowchart in FIG. 18, a portion where the same processing as that in the processes of steps S701 to S705 in FIG. 7 in the first exemplary embodiment is performed will not be described.

Figure 18:
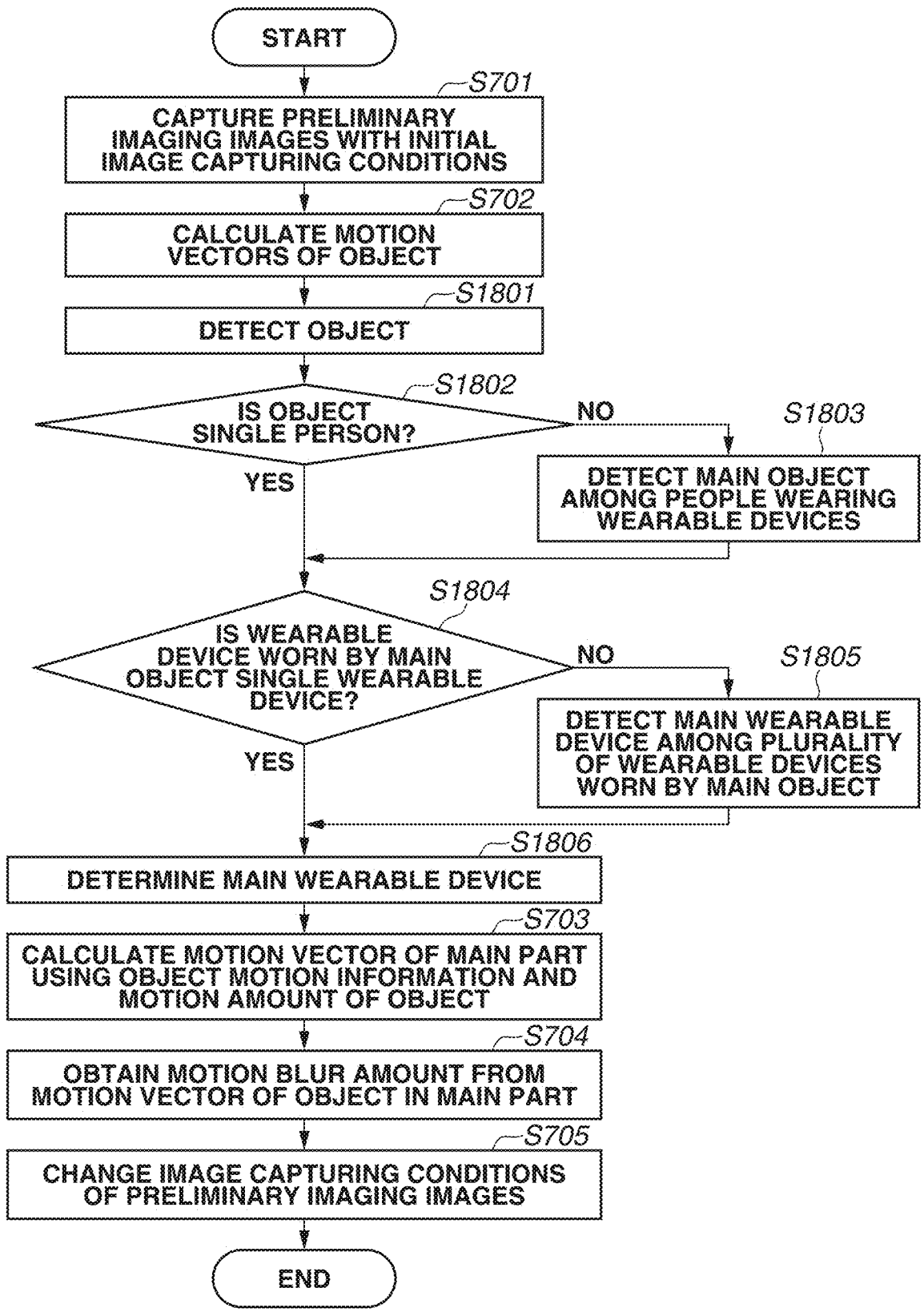
FIG. 18 is a flowchart illustrating a case where a wearable device is a plurality of wearable devices.

In step S701 in FIG. 18, the control unit 112 of the camera 101 reads the initial image capturing conditions from the ROM 113 of the camera 101 and successively captures preliminary imaging images according to the conditions.

In step S702, the image processing unit 124 of the camera 101 calculates motion vectors of the object from the chronologically successive preliminary imaging images captured in step S701.

In step S1801, the image processing unit 124 of the camera 101 detects the object from the chronologically successive preliminary imaging images captured in step S701. As the method for detecting the object, a technique such as a general object detection technique is used. Examples of the general object detection technique include face/facial part detection and head detection. The face/facial part detection and the head detection are methods for detecting a region where the face and the facial parts or the head of a person is present from a captured image using a technique based on pattern recognition or machine learning.

In step S1802, the image processing unit 124 determines whether the object detected in step S1801 is a single person or a plurality of people. If it is determined that the object is a single person (YES in step S1802), the processing proceeds to step S1804. If it is determined that the object is a plurality of people (NO in step S1802), the processing proceeds to step S1803.

In step S1803, since the detected object is a plurality of people in step S1802, the image processing unit 124 of the camera 101 detects a main object among the people wearing wearable devices 102. As the method for detecting the main object, a general main object detection technique may be used. For example, the person as the object occupying the largest area in the angle of view in each preliminary imaging image, or the person closest to the center of each preliminary imaging image may be detected as the main object. Alternatively, a configuration may be employed in which a person registered as the main object in advance in the ROM 113 of the camera 101 by the user is detected as the main object.

In step S1804, the control unit 112 of the camera 101 determines whether the wearable device 102 worn by the person detected as the main object in step S1803 is a single wearable device 102 or a plurality of wearable devices 102. If it is determined that the wearable device 102 is a single wearable device 102 (YES in step S1804), the processing proceeds to step S1806. If it is determined that the wearable device 102 is a plurality of wearable devices 102 (NO in step S1804), the processing proceeds to step S1805. As the method for determining the number of wearable devices 102, wearable devices 102 worn by each object may be registered in advance in the ROM 113 of the camera 101 by the user. Alternatively, as described in step S503 in FIG. 5 in the first exemplary embodiment, a method for determining the number of wearable devices 102 by the image processing unit 124 of the camera 101 identifying specific parts of each object detected in step S1801 to which wearable devices 102 are attached may be employed. Yet alternatively, a method for determining the number of wearable devices 102 by the communication unit 115 of the camera 101 and the communication module 131 of each wearable device 102 communicating with each other is also possible.

In step S1805, since it is determined in step S1804 that the wearable device 102 worn by the person detected as the main object through steps S1802 and S1803 is a plurality of wearable devices 102, a main wearable device 102 is detected among the plurality of wearable devices 102. A detailed description will be given of the method for detecting the main wearable device 102 with reference to a flowchart in FIG. 19.

In step S1901, the control unit 112 of the camera 101 determines whether the priorities of the wearable devices 102 are set in advance by the user. If it is determined that the priorities are set (YES in step S1901), the processing proceeds to step S1904. If it is determined that the priorities are not set (NO in step S1901), the processing proceeds to step S1902.

FIG. 20 illustrates, as an example where the priorities are set in advance by the user, an example of a setting screen where the priority levels of the wearable devices 102 can be set by the user on the display unit 127 of the camera 101. A configuration may be employed in which the display unit 127 serves not only as a display unit, but also as a touch panel that enables the user to input a setting value. FIG. 20 illustrates an example of a setting screen 2000 where the priority levels of the wearable devices 102 are set. An object identifier (ID) 2001 indicates the objects A to F in the image diagram in FIG. 17. A wearable device ID 2002 indicates the wearable devices 102 as the wearable devices 1701 to 1708 in the image diagram in FIG. 17. A priority level 2003 indicates the priority levels of the wearable devices 102. In this example of the setting screen, the user sets the priority level of the wearable device 102 as the wearable device 1704 worn by the object B to be the highest.

In step S1902, the control unit 112 of the camera 101 detects wearable devices 102 located for a certain period in a predetermined region of each preliminary imaging image. For example, in a case where the angle of view of the preliminary imaging image is defined as 100%, and a rectangular range centered on the center coordinates of the preliminary imaging image and corresponding to 90% is defined as a predetermined region, wearable devices 102 present for a time greater than or equal to an optionally set threshold in the predetermined region are detected.

In step S1903, the control unit 112 of the camera 101 calculates the priorities of the wearable devices 102 detected in step S1902 in a priority calculation unit (not illustrated). The priorities are calculated according to the setting contents of items for determining a priority set in advance by the user. FIG. 21 illustrates an example of a setting screen. A setting screen 2100 is used to set items for determining the priority of each wearable device 102. Items 2101 are the contents of the items for determining the priority and include items such as "order of speed of acceleration", "setting of attached part (head, torso, hand, or foot)", "area of face in angle of view", "area of attached part in angle of view", "order of distance between center of angle of view and wearable device 102", "order of distance between center of face and wearable device 102", and "face detection reliability". "Order of speed of acceleration" is an item to be set to heighten the priority of a wearable device 102 ranking high in the order of the speed of acceleration. "Attached part" is an item for setting a part among parts such as the head, the torso, the hand, and the foot to heighten the priority of a wearable device 102 attached to the set part. "Area of face in angle of view" is an item to be set to heighten the priority of a wearable device 102 worn by a person whose face is present in the angle of view and detected by face detection and has a large area ratio. "Area of attached part in angle of view" is an item to be set to heighten the priority of a wearable device 102 attached to a part such as the head, the torso, the hand, or the feet present in the angle of view and having a large area ratio. "Order of distance between center of angle of view and wearable device 102" is an item to be set to heighten the priority of a worn wearable device 102 in a case where the distance between the center coordinates of the angle of view and the center coordinates of the wearable device 102 is short. "Order of distance between center of face and wearable device 102" is an item to be set to heighten the priority of a worn wearable device 102 in a case where the distance between the center coordinates of the face and the center coordinates of the wearable device 102 is short. "Face detection reliability" is an item to be set to heighten the priority of a wearable device 102 in a case where the reliability of face detection of a person wearing the wearable device 102 is high. Items 2102 are items as standards for determining the priority of the main wearable device 102. Items selected among the contents of the items 2101 by the user are checked.

The method for calculating the priorities will be described with reference to FIG. 22A. For example, in a case where the items for determining the priority are set as described in FIG. 21, a score is calculated for each of the set items, and then, the total value obtained by adding the scores is calculated. The priority order of the wearable devices 102 is determined in descending order of the score of the total value, and the priority levels of the wearable devices 102 are determined similarly to FIG. 20 described in step S1901.

The method for calculating the score of the total value will be described with reference to FIG. 22A.

In FIG. 22A, an object ID 2201 indicates the objects A to F in the image diagram in FIG. 17. A wearable device ID 2202 indicates the wearable devices 102 as the wearable devices 1701 to 1708 in the image diagram in FIG. 17. An item 2203 is the score value of "order of speed of acceleration". The higher in the order of the speed the wearable device 102 ranks, the higher the score value of the wearable device 102 is. An item 2204 is the score value of "attached part". Since the hand is selected in FIG. 21, the score value of a wearable device 102 attached to the hand is high. An item 2205 is the score value of "order of distance between center of angle of view and wearable device 102". The shorter the distance between the center of the angle of view and the wearable device 102 is, the higher the score value is. An item 2206 is the score value of "face detection reliability order". The higher the reliability of face detection of the object is, the higher the score value is. An item 2207 is the total score value and is the total value of the score values calculated in the items 2203 to 2206. For example, a case is considered where the object B is detected as the main object in step S1803. The object B wears three wearable devices 102, namely the wearable devices 1702, 1703, and 1704. Then, if "attached part" as an item for determining the priority is set to the hand, the total score value of the wearable device 102 as the wearable device 1703 is the greatest, and the priority level of the wearable device 102 as the wearable device 1703 is the highest. FIG. 22B illustrates the results of the priority levels given based on the calculated total score values. In FIG. 22B, an object ID 2208 indicates the objects A to F in the image diagram in FIG. 17. A wearable device ID 2209 indicates the wearable devices 102 as the wearable devices 1701 to 1708 in the image diagram in FIG. 17. A priority level 2210 indicates the priority levels of the wearable devices 102.

If the object B wears wearable devices 102 on both their right and left hands, the score values of "attached part" are both 100. Thus, the higher the score value of another item is, the higher the priority is.

In step S1904, according to the priority levels calculated in step S1901 or S1903, the control unit 112 of the camera 101 temporarily determines the wearable device 102 having the highest priority level as the main wearable device 102 (a main sensor device).

In step S1905, the control unit 112 of the camera 101 determines whether the wearable device 102 temporarily determined in step S1904 is located for a certain period in a predetermined region of the preliminary imaging image. For example, in a case where the angle of view of the preliminary imaging image is defined as 100%, and a rectangular range centered on the center coordinates of the preliminary imaging image and corresponding to 90% is defined as a predetermined region, and if the wearable device 102 is present for a time greater than or equal to an optionally set threshold in the predetermined region (YES in step S1905), the processing proceeds to step S1907. If the wearable device 102 is not present (NO in step S1905), the processing proceeds to step S1906.

In step S1906, the control unit 112 of the camera 101 temporarily determines a wearable device 102 having the highest priority next to the wearable device 102 temporarily determined in step S1904 as the main wearable device 102. Then, the processing proceeds to step S1905. In step S1905, the determination is repeated until the processing proceeds to step S1907 where the main wearable device 102 is detected. After the determination is repeated, if it is determined that none of the wearable devices 102 having the priority levels determined in step S1901 or S1903 is located for the certain period in the predetermined region in the preliminary imaging image, the camera 101 determines a wearable device 102 set by default in advance as the main wearable device 102 in the next step S1907.

In step S1907, the control unit 112 of the camera 101 detects the wearable device 102 temporarily determined in step S1904 or S1906 as the main wearable device 102.

Figure 19:
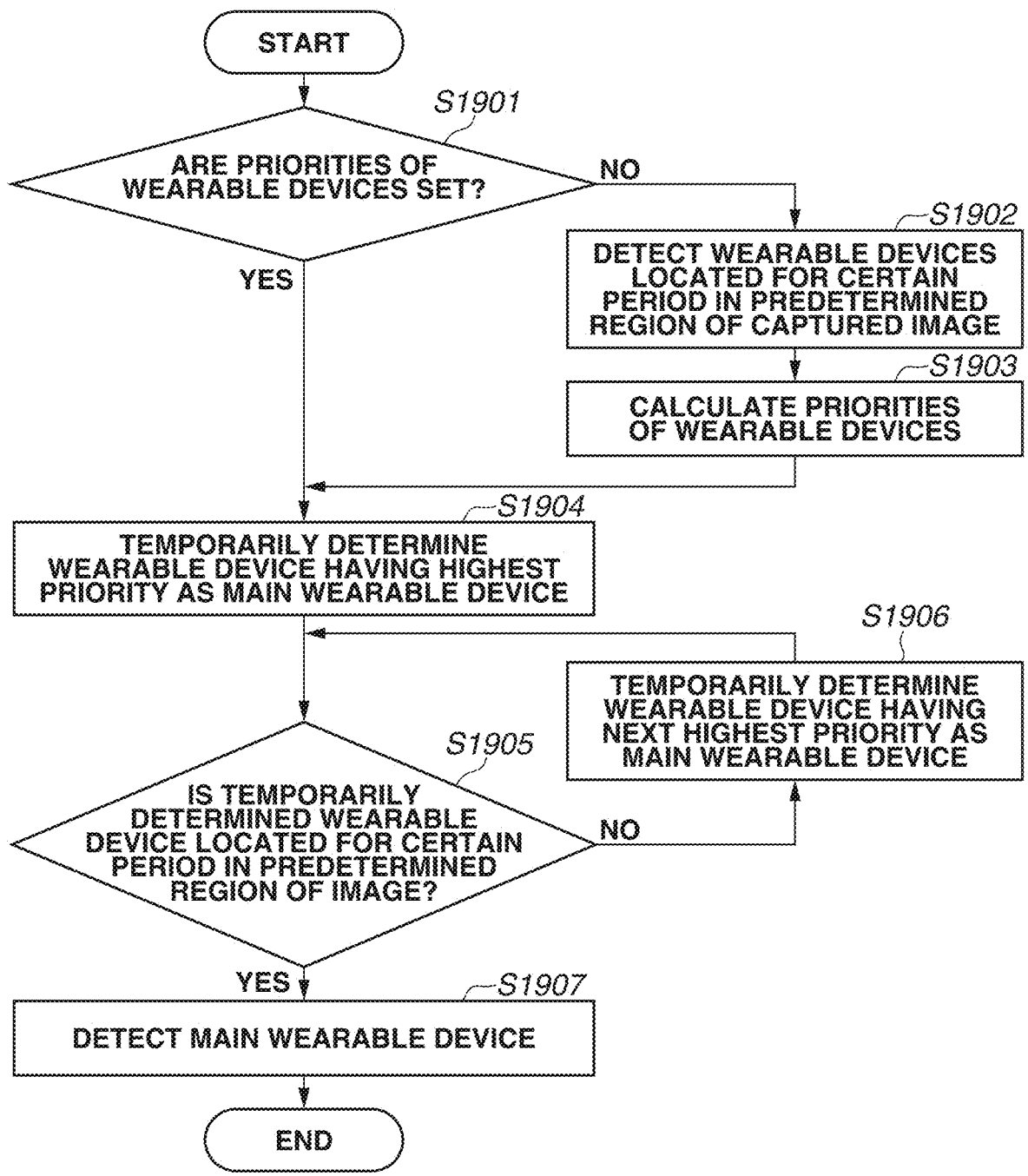
FIG. 19 is a flowchart for determining a main wearable device.

Next, in step S1806 in FIG. 18, based on the detection result of the flow in FIG. 19, the control unit 112 of the camera 101 determines the main wearable device 102 to acquire information regarding the wearable device 102 in the next step.

In step S703, similarly to step S703 in the first exemplary embodiment, the camera 101 calculates a vector corresponding to a main part of the object using the object motion information acquired from the main wearable device 102 determined in step S1806 and the motion vectors of the object obtained by the camera 101.

In step S704, similarly to step S704 in the first exemplary embodiment, according to an instruction from the control unit 112, the blur amount estimation unit (not illustrated) of the camera 101 estimates the motion blur amount of motion blur that occurs in the object based on the motion vector of the object in the main part calculated in the process of the above step and the shutter speed set by the user.

In step S705, similarly to step S705 in the first exemplary embodiment, the camera 101 compares the motion blur amount of the object calculated in step S704 and the acceptable motion amount, changes the shutter speed of a preliminary imaging image to be captured next to obtain a blur amount of the object less than or equal to the acceptable motion amount, and changes the image capturing conditions of preliminary imaging images.

The processing of the imaging system 100 according to the third exemplary embodiment has been described above. Specifically, even in the scene where an object is a plurality of people, a main wearable device 102 is determined from a plurality of wearable devices 102 worn by the plurality of people, and object motion information is sensed via the main wearable device 102. Then, using the object motion information acquired by the wearable device 102 as auxiliary information, a motion vector of the object is updated, and the image capturing conditions of the camera 101 are determined. Thus, it is possible to acquire an image in which object blur is reduced.

As the items for determining the priority of each wearable device 102, the items "order of speed of acceleration", "setting of attached part (head, torso, hand, or foot)", "area of face in angle of view", "area of attached part in angle of view", "order of distance between center of angle of view and wearable device 102", "order of distance between center of face and wearable device 102", and "face detection reliability" have been described. The items, however, are not limited to these. For example, a configuration may be employed in which the shorter "the distance between the camera and the object" or "the distance between the camera and the wearable device 102" is, the higher the score to be calculated is, and the higher the priority level is.

Other Exemplary Embodiments

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program. The present disclosure can also be achieved by a circuit (e.g., an application-specific integrated circuit (ASIC)) for achieving the one or more functions.

While desirable exemplary embodiments of the present disclosure have been described above, the present disclosure is not limited to these exemplary embodiments, and can be modified and changed in various ways within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-022342, filed Feb. 16, 2022, which is hereby incorporated by reference herein in its entirety.

What is claimed is:

1. An imaging system comprising an imaging apparatus and a sensor device,
the imaging apparatus comprising at least one processor and memory storing instructions that, when executed, configure the at least one processor of the imaging apparatus to function as:
an image capturing unit configured to capture an image of an object;
an object motion detection unit configured to detect motion of the object using the captured image;
a reception unit configured to receive a sensing result associated with the motion of the object; and
an exposure control unit configured to control exposure of the image capturing unit,
the sensor device being an apparatus different from the imaging apparatus and attached to the object to be captured and comprising at least one processor and memory storing instructions that, when executed, configure the at least one processor of the sensor device to function as:
a sensor unit configured to acquire motion information regarding the object; and
a transmission unit configured to transmit a sensing result of the sensor unit to the imaging apparatus,
wherein the imaging apparatus receives, from the transmission unit of the sensor device, the sensing result of the sensor unit and controls the exposure of the image capturing unit using the sensing result from the sensor device and the detected motion of the object captured by the imaging apparatus;
wherein the object motion detection unit calculates a motion vector of the object using the image captured by the image capturing unit;
wherein the exposure control unit controls the exposure of the imaging apparatus using the motion vector;

wherein the object motion detection unit selects the motion vector using the sensing result of the sensor unit, and wherein the exposure control unit controls the exposure of the imaging apparatus using the selected motion vector.

2. The imaging system according to claim 1, wherein the acquired motion information is based on any of an amount of motion of a part of the object to which the sensor device is attached, an amount of change in the motion of the object, and a change in a position of the object.

3. The imaging system according to claim 1, wherein the sensor unit further acquires information regarding a position to which the sensor device is attached.

4. The imaging system according to claim 1, wherein the imaging apparatus further comprises a calculation unit configured to calculate reliability of accuracy of the motion vector by calculating a correlation value, and wherein the exposure control unit controls the exposure of the imaging apparatus using a motion vector having reliability greater than or equal to a threshold.

5. The imaging system according to claim 1, wherein an update of an output of the sensor unit is faster than an update of an output of the object motion detection unit.

6. The imaging system according to claim 1, wherein after the image capturing unit starts the exposure, the exposure control unit controls an amount of accumulated charge.

7. An imaging system comprising an imaging apparatus and a sensor device, the imaging apparatus comprising at least one processor and memory storing instructions that, when executed, configure the at least one processor of the imaging apparatus to function as:

an image capturing unit configured to capture an image of an object;

an object motion detection unit configured to detect motion of the object using the captured image;

a reception unit configured to receive a sensing result associated with the motion of the object; and an exposure control unit configured to control exposure of the image capturing unit, the sensor device being an apparatus different from the imaging apparatus and attached to the object to be captured and comprising at least one processor and memory storing instructions that, when executed, configure the at least one processor of the sensor device to function as:

a sensor unit configured to acquire motion information regarding the object; and a transmission unit configured to transmit a sensing result of the sensor unit to the imaging apparatus, wherein the imaging apparatus receives, from the transmission unit of the sensor device, the sensing result of the sensor unit and controls the exposure of the image capturing unit using the sensing result from the sensor device and the detected motion of the object captured by the imaging apparatus;

wherein the object motion detection unit calculates a motion vector of the object using the image captured by the image capturing unit;

wherein the exposure control unit controls the exposure of the imaging apparatus using the motion vector;

wherein the imaging apparatus further comprises a correction unit configured to correct the motion vector based on the sensing result of the sensor unit, and wherein the exposure control unit controls the exposure of the imaging apparatus using the motion vector corrected by the correction unit.

8. An imaging system comprising an imaging apparatus and a sensor device, the imaging apparatus comprising at least one processor and memory storing instructions that, when executed, configure the at least one processor of the imaging apparatus to function as:

an image capturing unit configured to capture an image of an object;

an object motion detection unit configured to detect motion of the object using the captured image;

a reception unit configured to receive a sensing result associated with the motion of the object; and an exposure control unit configured to control exposure of the image capturing unit, the sensor device being an apparatus different from the imaging apparatus and attached to the object to be captured and comprising at least one processor and memory storing instructions that, when executed, configure the at least one processor of the sensor device to function as:

a sensor unit configured to acquire motion information regarding the object; and a transmission unit configured to transmit a sensing result of the sensor unit to the imaging apparatus, wherein the imaging apparatus receives, from the transmission unit of the sensor device, the sensing result of the sensor unit and controls the exposure of the image capturing unit using the sensing result from the sensor device and the detected motion of the object captured by the imaging apparatus;

wherein the object motion detection unit calculates a motion vector of the object using the image captured by the image capturing unit;

wherein the imaging apparatus further comprises a blur amount estimation unit configured to, based on the calculation of the motion vector by the object motion detection unit and an exposure time set by the exposure control unit, estimate a blur amount of the image when the image is captured, and wherein the exposure control unit controls the exposure of the imaging apparatus based on a result of the blur amount estimation unit.

9. An imaging system comprising an imaging apparatus and a sensor device, the imaging apparatus comprising at least one processor and memory storing instructions that, when executed, configure the at least one processor of the imaging apparatus to function as:

an image capturing unit configured to capture an image of an object;

an object motion detection unit configured to detect motion of the object using the captured image;

a reception unit configured to receive a sensing result associated with the motion of the object; and an exposure control unit configured to control exposure of the image capturing unit, the sensor device being an apparatus different from the imaging apparatus and attached to the object to be captured and comprising at least one processor and memory storing instructions that, when executed, configure the at least one processor of the sensor device to function as:

a sensor unit configured to acquire motion information regarding the object; and a transmission unit configured to transmit a sensing result of the sensor unit to the imaging apparatus, wherein the imaging apparatus receives, from the transmission unit of the sensor device, the sensing result of the sensor unit and controls the exposure of the image capturing unit using the sensing result from the sensor device and the detected motion of the object captured by the imaging apparatus, wherein the imaging apparatus further comprises a determination unit configured to determine a main sensor device from among a plurality of sensor devices, and wherein the exposure control unit controls the exposure of the imaging apparatus using a sensing result of the main sensor device and a result of the object motion detection unit.

10. The imaging system according to claim 9, wherein the determination unit includes a priority calculation unit configured to calculate a priority indicating that the sensor device is the main sensor device, and wherein the greater an acceleration of the sensor device is, or the shorter a distance from a center of the image is, or the shorter a distance from a camera is, or the greater an area of the object to which the sensor device is attached is, or the greater an area of a part to which the sensor device is attached is, the higher the priority to be calculated by the priority calculation unit is.

11. A control method for controlling an imaging system, the control method comprising:

in control of an imaging apparatus, capturing an image of an object;

detecting a motion of the object using the captured image;

receiving a sensing result associated with the motion of the object; and controlling exposure, in control of a sensor device different from the imaging apparatus and attached to the object to be captured, acquiring information regarding the object; and transmitting a sensing result to the imaging apparatus, wherein the imaging apparatus receives, from the sensor device, the sensing result of the sensor device and controls the exposure using the sensing result from the sensor device and the detected motion of the object captured by the imaging apparatus, wherein, in the detecting, a motion vector of the object is calculated by using the image;

wherein the motion vector using the sensing result of the sensor unit is selected, and wherein the exposure of the imaging apparatus is controlled by using the selected motion vector.

12. A non-transitory computer-readable storage medium storing a program that when executed on a computer causes the computer to perform a control for an imaging system, the control method comprising;

in control of an imaging apparatus, capturing an image of an object;

detecting a motion of the object using the captured image;

receiving a sensing result associated with the motion of the object; and controlling exposure, in control of a sensor device different from the imaging apparatus and attached to the object to be captured, acquiring information regarding the object; and transmitting a sensing result to the imaging apparatus, wherein the imaging apparatus receives, from the sensor device, the sensing result of the sensor device and controls the exposure using the sensing result from the sensor device and the detected motion of the object captured by the imaging apparatus, wherein, in the detecting, a motion vector of the object is calculated by using the image;

wherein the motion vector using the sensing result of the sensor unit is selected, and wherein the exposure of the imaging apparatus is controlled by using the selected motion vector.

13. A control method for controlling an imaging system, the control method comprising:

in control of an imaging apparatus, capturing an image of an object;

detecting a motion of the object using the captured image;

receiving a sensing result associated with the motion of the object; and controlling exposure, in control of a sensor device different from the imaging apparatus and attached to the object to be captured, acquiring information regarding the object, transmitting a sensing result to the imaging apparatus; and determining a main sensor device from among a plurality of sensor devices, wherein the imaging apparatus receives, from the sensor device, the sensing result of the sensor device and controls the exposure using the sensing result from the sensor device and the detected motion of the object captured by the imaging apparatus, wherein the exposure of the imaging apparatus is controlled by using a sensing result of the main sensor device and a result of the object motion detection.

14. A non-transitory computer-readable storage medium storing a program that when executed on a computer causes the computer to perform a control for an imaging system, the control method comprising;

in control of an imaging apparatus, capturing an image of an object;

detecting a motion of the object using the captured image;

receiving a sensing result associated with the motion of the object; and controlling exposure, in control of a sensor device different from the imaging apparatus and attached to the object to be captured, acquiring information regarding the object, transmitting a sensing result to the imaging apparatus; and determining a main sensor device from among a plurality of sensor devices, wherein the imaging apparatus receives, from the sensor device, the sensing result of the sensor device and controls the exposure using the sensing result from the sensor device and the detected motion of the object captured by the imaging apparatus, wherein the exposure of the imaging apparatus is controlled by using a sensing result of the main sensor device and a result of the object motion detection.

* * * * *